(12) United States Patent
Perugupalli et al.

(10) Patent No.: US 12,075,155 B1
(45) Date of Patent: Aug. 27, 2024

(54) SYSTEM AND METHODS FOR SLIDE IMAGING

(71) Applicant: Pramana, Inc., Cambridge, MA (US)

(72) Inventors: Prasanth Perugupalli, Cary, NC (US); Ganesh Ramamoorthy, Andover, MA (US); Prateek Jain, Bengaluru (IN); Bharathwaj Raghunathan, Oakville (CA)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/392,520

(22) Filed: Dec. 21, 2023

(51) Int. Cl.
*H04N 23/60* (2023.01)
*G02B 21/34* (2006.01)
*G02B 21/36* (2006.01)
*H04N 23/61* (2023.01)

(52) U.S. Cl.
CPC ............ *H04N 23/64* (2023.01); *G02B 21/34* (2013.01); *G02B 21/365* (2013.01); *H04N 23/61* (2023.01)

(58) Field of Classification Search
CPC ........ H04N 23/64; H04N 23/61; G02B 21/34; G02B 21/36; G02B 21/18; G02B 21/365; G02B 21/361; G02B 21/362
USPC ....................................................... 348/79
See application file for complete search history.

(56) References Cited

U.S. PATENT DOCUMENTS

| | | | |
|---|---|---|---|
| 8,116,543 B2 | 2/2012 | Perz et al. | |
| 8,199,997 B2 | 6/2012 | Rutenberg et al. | |
| 8,565,503 B2 | 10/2013 | Eichhorn et al. | |
| 8,705,825 B2 | 4/2014 | Olson et al. | |
| 9,014,480 B2 | 4/2015 | Baheti et al. | |
| 9,342,741 B2 | 5/2016 | Amtrup et al. | |
| 10,255,693 B2 | 4/2019 | Smith | |
| 11,315,251 B2 | 4/2022 | Gholap et al. | |
| 11,430,202 B2 | 8/2022 | Whitestone et al. | |
| 11,449,973 B2 | 9/2022 | Rutenberg et al. | |
| 11,636,627 B2 | 4/2023 | Siegel et al. | |
| 2004/0170312 A1* | 9/2004 | Soenksen ............... | H04N 23/56 382/284 |
| 2011/0164314 A1 | 7/2011 | Shirota et al. | |

(Continued)

FOREIGN PATENT DOCUMENTS

WO 2023/111204 A1 6/2023

OTHER PUBLICATIONS

Alzuru, A. Matsunaga, M. Tsugawa and J. A. B. Fortes, "General Self-aware Information Extraction from Labels of Biological Collections," 2020 IEEE International Conference on Big Data (Big Data), Atlanta, GA, USA, 2020, pp. 3035-3044, doi: 10.1109/BigData50022.2020.9377737. (Year: 2020).

(Continued)

*Primary Examiner* — Frantz B Jean
(74) *Attorney, Agent, or Firm* — Caldwell Intellectual Property Law

(57) ABSTRACT

Aspects of present disclosure relate to slide imaging. An exemplary system for imaging a slide includes at least an optical system, including an optical sensor; a slide port configured to hold a slide; and a first computing device configured to: capture, using the at least an optical system, a plurality of images of the slide, including a first image; automatically select an algorithm to apply to the first image; identify a control command as a function of the first image; and capture, using the at least an optical system, a second image of the plurality of images as a function of the control command.

20 Claims, 10 Drawing Sheets

(56) References Cited

U.S. PATENT DOCUMENTS

| | | |
|---|---|---|
| 2011/0242308 A1 | 10/2011 | Igarashi et al. |
| 2012/0127297 A1 | 5/2012 | Baxi et al. |
| 2013/0027539 A1 | 1/2013 | Kiyota et al. |
| 2013/0076888 A1 | 3/2013 | Hibino et al. |
| 2014/0184780 A1* | 7/2014 | Abe ................ G02B 21/367 348/80 |
| 2017/0285008 A1 | 10/2017 | Nolan et al. |
| 2018/0100997 A1* | 4/2018 | Zou ................ G02B 21/006 |
| 2020/0167914 A1 | 5/2020 | Stamatoyannopoulos et al. |
| 2020/0372638 A1 | 11/2020 | Gregson et al. |
| 2020/0388396 A1 | 12/2020 | Lindvall |
| 2021/0117815 A1 | 4/2021 | Creed et al. |
| 2021/0151287 A1 | 5/2021 | Hyde et al. |
| 2022/0058776 A1 | 2/2022 | Ozcan et al. |
| 2022/0076411 A1 | 3/2022 | Georgescu et al. |
| 2022/0179187 A1* | 6/2022 | Harfouche ........ G02B 21/368 |
| 2023/0115733 A1 | 4/2023 | Oldfather et al. |
| 2023/0143800 A1 | 5/2023 | Casas |
| 2023/0206416 A1 | 6/2023 | Maier et al. |
| 2023/0221342 A1 | 7/2023 | Gebing et al. |

OTHER PUBLICATIONS

Manzo et al; Whole Slide Scanning Solution For Pathology Glass Slides of Challenging Variable Quality; Date: Unknown.

\* cited by examiner

US 12,075,155 B1

SYSTEM AND METHODS FOR SLIDE IMAGING

FIELD OF THE INVENTION

The present invention generally relates to the field of medical imaging. In particular, the present invention is directed to a system and methods for slide imaging.

BACKGROUND

While the computing capabilities of embedded devices like digital pathology scanners have increased, they have limited computing power. This limits the capabilities of these devices, particularly in the number of different tasks one can perform on a device. Analysis of images may be done on separate, potentially more powerful, systems, but this severely limits the use cases of this analysis since the processing extends beyond completion of a slide imaging step.

SUMMARY OF THE DISCLOSURE

In an aspect, a system for imaging a slide may include a slide port configured to receive a slide; at least an optical system, wherein the at least an optical system comprises at least an optical sensor configured to capture a first image of the received slide; and a first computing device configured to receive the first image from the at least an optical system; automatically select at least an algorithm to apply to the first image; identify a control command as a function of the selected algorithm upon execution of the selected processing algorithm; and configure the at least an optical system to capture a second image of the slide at the slide port through the at least an optical sensor as a function of the control command.

In another aspect, a method of imaging a slide may include using at least a processor, receiving a first image of a slide from at least an optical system; using at least a processor, automatically selecting at least an algorithm to apply to the first image; using at least a processor, identifying a control command as a function of the selected algorithm upon execution of the selected processing algorithm; and using at least a processor, configuring the at least an optical system to capture a second image of the slide using the at least an optical system as a function of the control command.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for slide imaging. A system described herein may generate images of slides and/or samples on slides. In an embodiment, a system may capture a first image, analyze first image while capture of additional images is ongoing, and determine a control command based on first image in order to determine parameters of subsequent images and/or whether to capture subsequent images. For example, analysis of first image may include identifying a region of interest based on regions of first image most likely to contain a sample. In this example, a control command may direct the system to capture detailed images of any regions of interest, improving efficiency of subsequent image capture. In some embodiments, an algorithm applied to an image may be determined from optical character recognition analysis of first image for annotations on slides. Exemplary embodiments illustrating aspects of the present disclosure are described below in the context of several specific examples.

Figure 1:
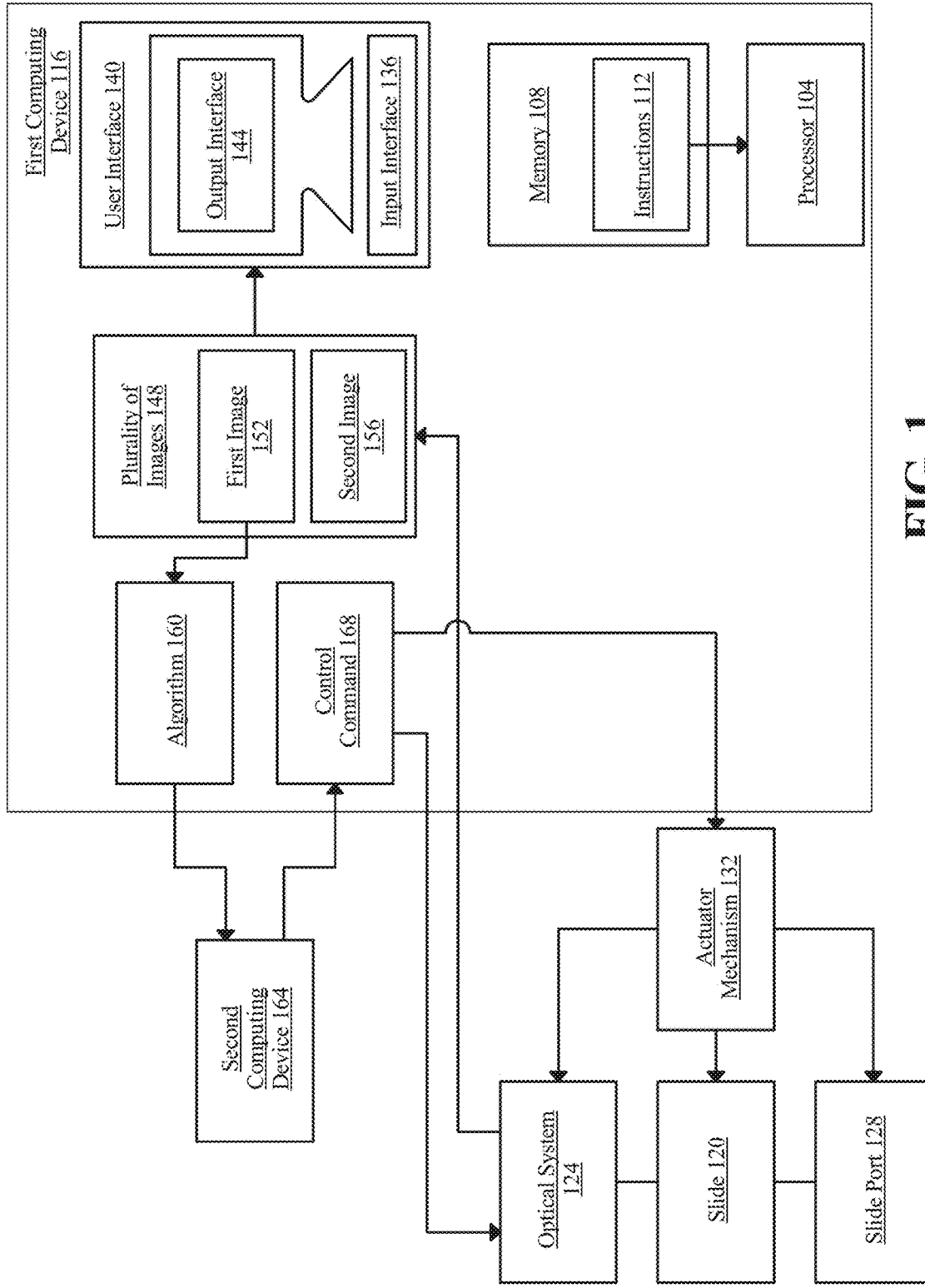
FIG. 1 is a diagram depicting an exemplary apparatus for slide imaging.

Referring now to FIG. 1, an exemplary embodiment of an apparatus 100 for slide imaging is disclosed. Apparatus 100 may include a processor 104. Processor 104 may include, without limitation, any processor 104 described in this disclosure. Processor 104 may be included in first computing device. Apparatus 100 may include at least a processor 104 and a memory 108 communicatively connected to the at least a processor 104, the memory 108 containing instructions 112 configuring the at least a processor 104 to perform one or more processes described herein. Apparatus 100 may include first computing device 116. First computing device 116 may include processor 104 and/or memory 108. First computing device 116 may be configured to perform a process described herein. First computing device 116 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, apparatus 100 may be used to generate an image of slide 120 and/or a sample on slide 120. As used herein, a "slide" is a container or surface holding a sample of interest. In some embodiments, slide 120 may include a glass slide. In some embodiments, slide 120 may include a formalin fixed paraffin embedded slide. In some embodiments, a sample on slide 120 may be stained. In some embodiments, slide 120 may be substantially transparent. In some embodiments, slide 120 may include a thin, flat, and substantially transparent glass slide. In some embodiments, a transparent cover may be applied to slide 120 such that a sample is between slide 120 and this cover. A sample may include, in non-limiting examples, a blood smear, pap smear, body fluids, and non-biologic samples. In some embodiments, a sample on slide 120 may include tissue. In some embodiments, sample on slide 120 may be frozen.

Still referring to FIG. 1, in some embodiments, slide 120 and/or a sample on slide 120 may be illuminated. In some embodiments, apparatus 100 may include a light source. As used herein, a "light source" is any device configured to emit electromagnetic radiation. In some embodiments, light source may emit a light having substantially one wavelength. In some embodiments, light source may emit a light having a wavelength range. Light source may emit, without limitation, ultraviolet light, visible light, and/or infrared light. In non-limiting examples, light source may include a light-emitting diode (LED), an organic LED (OLED) and/or any other light emitter. Such a light source may be configured to illuminate slide 120 and/or sample on slide 120. In a non-limiting example, light source may illuminate slide 120 and/or sample on slide 120 from below.

Still referring to FIG. 1, in some embodiments, apparatus 100 may include at least an optical system 124. As used in this disclosure, an "optical system" is an arrangement of one or more components which together act upon or employ electromagnetic radiation. In non-limiting examples, electromagnetic radiation may include light, such as visible light, infrared light, UV light, and the like. An optical system may include one or more optical elements, including without limitation lenses, mirrors, windows, filters, and the like. An optical system may form an optical image that corresponds to an optical object. For instance, an optical system may form an optical image at or upon an optical sensor, which can capture, e.g., digitize, the optical image. In some cases, optical system may have at least a magnification. For instance, optical system may include an objective (e.g., microscope objective) and one or more reimaging optical elements that together produce an optical magnification. In some cases, optical magnification may be referred to herein as zoom. Optical system 124 may include one or more optical sensors. As used herein, an "optical sensor" is a device that measures light and converts the measured light into one or more signals; one or more signals may include, without limitation, one or more electrical signals. An optical sensor may be configured to capture an image of a slide, such as a slide in a slide port. In some embodiments, optical sensor may include at least a photodetector. As used herein, a "photodetector" is a device that is sensitive to light and thereby able to detect light. In some embodiments, a photodetector may include a photodiode, a photoresistor, a photosensor, a photovoltaic chip, and the like. In some embodiments, optical sensor may include a plurality of photodetectors. Optical sensor may include, without limitation, a camera. Optical sensor may be in electronic communication with at least a processor 104 of apparatus 100. As used herein, "electronic communication" as used in this disclosure is a shared data connection between two or more devices. In some embodiments, apparatus 100 may include two or more optical sensors.

Still referring to FIG. 1, in some embodiments, optical system 124 may include a macro camera specialized to capture images of small subjects at close distances, producing life-size or larger-than-life magnifications. In some cases, macro camera as described herein may achieve a 1:1 magnification ratio or greater. In some cases, macro camera may include one or more lenses having a short minimum focusing distance e.g., 30 cm. In some embodiments, due to such close focusing distance, the depth of field may be shallow in macro photography, therefore, in some cases, some visual information such as image background may be isolated and discarded. In some cases, an aperture with a high f-number may be used in micro camera to increase the depth of field; however, more light or longer exposure times may be required. Additionally, or alternatively, an image stabilization system may be implemented in order to counteract undesired camera movements. Further, micro camera may include additional sensors such as, without limitation, a full-frame sensor, APS-C sensor, micro four-thirds sensor, and the like.

Still referring to FIG. 1, an exemplary lens construction of macro camera as described above may be designed to optimize performance at close focusing distances, wherein the macro camera may include a front group optics including a large diameter aspherical lens (to correct spherical aberration) and a low dispersion (LD) lens (to correct chromatic aberration), a middle group optics including a floating lens element (to improve close-up performance) and a standard spherical lens, and a rear group optics including a high refractive index lens (to correct field curvature and enhance sharpness) and an aspherical lens (to further correct for aberrations). In some cases, macro camera may further include an aperture diaphragm located between middle and rear group optics, wherein the aperture diaphragm may be configured to control the amount of light entering macro camera and affecting the depth of field. In some cases, one or more optics as described herein may be coated with a multi-layer anti-reflective coating to reduce lens flare and ghosting.

Still referring to FIG. 1, as used herein, "image data" is information representing at least a physical scene, space, and/or object. Image data may include, for example, information representing a sample, slide 120, or region of a sample or slide. In some cases, image data may be generated by a camera. "Image data" may be used interchangeably through this disclosure with "image," where image is used as a noun. An image may be optical, such as without limitation where at least an optic is used to generate an image of an object. An image may be digital, such as without limitation when represented as a bitmap. Alternatively, an image may include any media capable of representing a physical scene, space, and/or object. Alternatively, where "image" is used as a verb, in this disclosure, it refers to generation and/or formation of an image.

Still referring to FIG. 1, in some embodiments, apparatus 100 may include a slide port 128. In some embodiments, slide port 128 may be configured to hold slide 120. In some embodiments, slide port 128 may include one or more alignment features. As used herein, an "alignment feature" is a physical feature that helps to secure a slide in place and/or align a slide with another component of an apparatus. In some embodiments, alignment feature may include a component which keeps slide 120 secure, such as a clamp, latch, clip, recessed area, or another fastener. In some embodiments, slide port 128 may allow for easy removal or insertion of slide 120. In some embodiments, slide port 128 may include a transparent surface through which light may travel. In some embodiments, slide 120 may rest on and/or may be illuminated by light traveling through such a transparent surface. In some embodiments, slide port 128 may be mechanically connected to an actuator mechanism 132 as described below.

Still referring to FIG. 1, in some embodiments, apparatus 100 may include an actuator mechanism 132. As used herein, an "actuator mechanism" is a mechanical component configured to change the relative position of a slide and an optical system. In some embodiments, actuator mechanism 132 may be mechanically connected to slide 120, such as slide 120 in slide port 128. In some embodiments, actuator mechanism 132 may be mechanically connected to slide port 128. For example, actuator mechanism 132 may move slide port 128 in order to move slide 120. In some embodiments, actuator mechanism 132 may be mechanically connected to at least an optical system 124. In some embodiments, actuator mechanism 132 may be mechanically connected to a mobile element. As used herein, a "mobile element" refers to any movable or portable object, component, and device within apparatus 100 such as, without limitation, a slide, a slide port, or an optical system. In some embodiments, a mobile element may move such that optical system 124 is positioned correctly with respect to slide 120 such that optical system 124 may capture an image of slide 120 according to a parameter set. In some embodiments, actuator mechanism 132 may be mechanically connected to an item selected from the list consisting of slide port 128, slide 120, and at least an optical system 124. In some embodiments, actuator mechanism 132 may be configured to change the relative position of slide 120 and optical system 124 by moving slide port 128, slide 120, and/or optical system 124.

Still referring to FIG. 1, actuator mechanism 132 may include a component of a machine that is responsible for moving and/or controlling a mechanism or system. Actuator mechanism 132 may, in some embodiments, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, an actuator may have an energy or power source other than control signal. This may include a main energy source, which may include for example electric power, hydraulic power, pneumatic power, mechanical power, and the like. In some embodiments, upon receiving a control signal, actuator mechanism 132 responds by converting source power into mechanical motion. In some cases, actuator mechanism 132 may be understood as a form of automation or automatic control.

Still referring to FIG. 1, in some embodiments, actuator mechanism 132 may include a hydraulic actuator. A hydraulic actuator may consist of a cylinder or fluid motor that uses hydraulic power to facilitate mechanical operation. Output of hydraulic actuator mechanism 132 may include mechanical motion, such as without limitation linear, rotary, or oscillatory motion. In some embodiments, hydraulic actuator may employ a liquid hydraulic fluid. As liquids, in some cases, are incompressible, a hydraulic actuator can exert large forces. Additionally, as force is equal to pressure multiplied by area, hydraulic actuators may act as force transformers with changes in area (e.g., cross sectional area of cylinder and/or piston). An exemplary hydraulic cylinder may consist of a hollow cylindrical tube within which a piston can slide. In some cases, a hydraulic cylinder may be considered single acting. Single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. Double acting may be used when pressure is applied substantially on each side of a piston; any difference in resultant force between the two sides of the piston causes the piston to move.

Still referring to FIG. 1, in some embodiments, actuator mechanism 132 may include a pneumatic actuator mechanism 132. In some cases, a pneumatic actuator may enable considerable forces to be produced from relatively small changes in gas pressure. In some cases, a pneumatic actuator may respond more quickly than other types of actuators, for example hydraulic actuators. A pneumatic actuator may use compressible fluid (e.g., air). In some cases, a pneumatic actuator may operate on compressed air. Operation of hydraulic and/or pneumatic actuators may include control of one or more valves, circuits, fluid pumps, and/or fluid manifolds.

Still referring to FIG. 1, in some cases, actuator mechanism 132 may include an electric actuator. Electric actuator mechanism 132 may include any of electromechanical actuators, linear motors, and the like. In some cases, actuator mechanism 132 may include an electromechanical actuator. An electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. Electric actuator mechanism 132 may include a linear motor. Linear motors may differ from electromechanical actuators, as power from linear motors is output directly as translational motion, rather than output as rotational motion and converted to translational motion. In some cases, a linear motor may cause lower friction losses than other devices. Linear motors may be further specified into at least 3 different categories, including flat linear motor, U-channel linear motors and tubular linear motors. Linear motors may be directly controlled by a control signal for controlling one or more linear motor parameters. Exemplary linear motor parameters include without limitation position, force, velocity, potential, and current.

Still referring to FIG. 1, in some embodiments, an actuator mechanism 132 may include a mechanical actuator mechanism 132. In some cases, a mechanical actuator mechanism 132 may function to execute movement by converting one kind of motion, such as rotary motion, into another kind, such as linear motion. An exemplary mechanical actuator includes a rack and pinion. In some cases, a mechanical power source, such as a power take off may serve as power source for a mechanical actuator. Mechanical actuators may employ any number of mechanisms, including for example without limitation gears, rails, pulleys, cables, linkages, and the like.

Still referring to FIG. 1, in some embodiments, actuator mechanism 132 may be in electronic communication with actuator controls. As used herein, "actuator controls" is a system configured to operate actuator mechanism such that a slide and an optical system reach a desired relative position. In some embodiments, actuator controls may operate actuator mechanism 132 based on input received from a user interface 140. In some embodiments, actuator controls may be configured to operate actuator mechanism 132 such that optical system 124 is in a position to capture an image of an entire sample. In some embodiments, actuator controls may be configured to operate actuator mechanism 132 such that optical system 124 is in a position to capture an image of a region of interest, a particular horizontal row, a particular point, a particular focus depth, and the like. Electronic communication between actuator mechanism 132 and actuator controls may include transmission of signals. For example, actuator controls may generate physical movements of actuator mechanism in response to an input signal. First computing device 116 may be operatively connected to one or more other functional components optical system 124, actuator controls and/or actuator mechanism 132. In some embodiments, input signal may be received by actuator controls from first computing device 116, processor 104 and/or input interface 136.

Still referring to FIG. 1, as used in this disclosure, a "signal" is any intelligible representation of data, for example from one device to another. A signal may include an optical signal, a hydraulic signal, a pneumatic signal, a mechanical signal, an electric signal, a digital signal, an analog signal, and the like. In some cases, a signal may be used to communicate with a computing device, for example by way of one or more ports. In some cases, a signal may be transmitted and/or received by a computing device, for example by way of an input/output port. An analog signal may be digitized, for example by way of an analog to digital converter. In some cases, an analog signal may be processed, for example by way of any analog signal processing steps described in this disclosure, prior to digitization. In some cases, a digital signal may be used to communicate between two or more devices, including without limitation computing devices. In some cases, a digital signal may be communicated by way of one or more communication protocols, including without limitation internet protocol (IP), controller area network (CAN) protocols, serial communication protocols (e.g., universal asynchronous receiver-transmitter [UART]), parallel communication protocols (e.g., IEEE 128 [printer port]), and the like.

Still referring to FIG. 1, in some embodiments, apparatus 100 may perform one or more signal processing steps on a signal. For instance, apparatus 100 may analyze, modify, and/or synthesize a signal representative of data in order to improve the signal, for instance by improving transmission, storage efficiency, or signal to noise ratio. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which vary continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Still referring to FIG. 1, in some embodiments, apparatus 100 may include a user interface 140. User interface 140 may include output interface 144 and input interface 136. In some embodiments, output interface 144 may include one or more elements through which apparatus 100 may communicate information to a user. In a non-limiting example, output interface 144 may include a display. A display may include a high resolution display. A display may output images, videos, and the like to a user. In another non-limiting example, output interface 144 may include a speaker. A speaker may output audio to a user. In another non-limiting example, output interface 144 may include a haptic device. A speaker may output haptic feedback to a user.

Still referring to FIG. 1, as used herein, a "display device" is a device that is used to display content. As used herein, a "user interface" is a means by which a user and a computer system interact. For example, a user and a computer system may interact through the use of input devices and/or software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, a user interface may include a graphical user interface. As used herein, a "graphical user interface (GUI)" is a graphical form of user interface that allows users to interact with electronic devices. In some embodiments, output interface may include one or more elements through which computing device 116 and/or optical system 124 may communicate information to a human operator. In a non-limiting example, output interface may include a display e.g., a high-resolution display. In some cases, display may output images, videos, and the like to a user. In a non-limiting example, a computing device 116 may display a notification on user interface. Additionally, or alternatively, computing device 116 may integrate with other output systems or devices, such as speakers, light sources, and/or haptic feedback mechanisms to communicate with a user.

Still referring to FIG. 1, in some embodiments, optical system 124 may include a camera. In some cases, a camera may include one or more optics. Exemplary non-limiting optics include spherical lenses, aspherical lenses, reflectors, polarizers, filters, windows, aperture stops, and the like. In some embodiments, one or more optics associated with a camera may be adjusted in order to, in non-limiting examples, change the zoom, depth of field, and/or focus distance of the camera. In some embodiments, one or more of such settings may be configured to detect a feature of a sample on slide 120. In some embodiments, one or more of such settings may be configured based on a parameter set, as described below. In some embodiments, camera may capture images at a low depth of field. In a non-limiting example, camera may capture images such that a first depth of sample is in focus and a second depth of sample is out of focus. In some embodiments, an autofocus mechanism may be used to determine focus distance. In some embodiments, focus distance may be set by parameter set. In some embodiments, camera may be configured to capture a plurality of images at different focus distances. In a non-limiting example, camera may capture a plurality of images at different focus distances, such that images are captured where each focus depth of the sample is in focus in at least one image. In some embodiments, at least a camera may include an image sensor. Exemplary non-limiting image sensors include digital image sensors, such as without limitation charge-coupled device (CCD) sensors and complimentary metal-oxide-semiconductor (CMOS) sensors. In some embodiments, a camera may be sensitive within a non-visible range of electromagnetic radiation, such as without limitation infrared.

Still referring to FIG. 1, in some embodiments, input interface 136 may include controls for operating apparatus 100. Such controls may be operated by a user. Input interface 136 may include, in non-limiting examples, a camera, microphone, keyboard, touch screen, mouse, joystick, foot pedal, button, dial, and the like. Input interface 136 may accept, in non-limiting examples, mechanical input, audio input, visual input, text input, and the like. In some embodiments, audio inputs into input interface 136 may be interpreted using an automatic speech recognition function, allowing a user to control apparatus 100 via speech. In some embodiments, input interface 136 may approximate controls of a microscope.

Still referring to FIG. 1, apparatus 100 may capture plurality of images 148 and/or receive plurality of images 148 from optical system 124. Plurality of images 148 may include images of slide 120. Plurality of images 148 may be captured using optical system 124. Plurality of images 148 may include first image 152 and/or second image 156. First image 152 may be captured before algorithms described below are run. First image 152 may be used to determine which algorithms described below are selected and/or may be used as an input into algorithms described below. Second image 156 may be captured after algorithms described below are run and/or may be captured as a function of algorithms described below.

Still referring to FIG. 1, first image 152 may include an initial capture, which may serve as a starting point for further processing steps as described below. First image may be configured to provide raw data or visual information about slide 120. First image may be associated with metadata, such as a slide ID, a subject ID, a magnification level, lighting conditions, a type of slide, a time of capture, and/or other relevant data an optical system may record. Such metadata may be saved in a database and may be retrieved from the database by, for example, querying a slide ID. In some embodiments, first image may be captured according to default scanning parameters. Default scanning parameters may include a high throughput scanning mode. In a non-limiting example, a default scanning profile may be used to capture first image 152, wherein the default scanning profile may include any scanning mode described in U.S. patent application Ser. No. 18/382,769, filed on Oct. 23, 2023, and titled "SYSTEM AND METHOD OF DIGITALIZING A SLIDE," the entirety of which is incorporated herein by reference.

Still referring to FIG. 1, in some embodiments, capturing an image of plurality of images 148 may include using actuator mechanism 132 and/or actuator controls to move optical system 124 and/or slide 120 into desired positions. In some embodiments, first image 152 includes an image of an entire sample on slide 120 and/or the entire slide 120. In some embodiments, first image 152 includes an image of a region of a sample. In some embodiments, first image 152 includes a wider angle image than second image 156. In some embodiments, first image 152 may include a lower resolution image than second image 156.

Still referring to FIG. 1, apparatus 100 may automatically select algorithm 160 to apply to first image 152. Algorithm 160 may be applied to first image 152 and/or additional images of plurality of images 148. Algorithms which may be applied to first image 152 include, in non-limiting examples, artifact removal algorithms, image processing algorithms, algorithms for selecting a region of interest, image segmentation algorithms, focus pattern recognition algorithms, feature detection algorithms, color correction algorithms, 3D reconstruction algorithms, quantitative analysis algorithms, and image classification algorithms. Non-limiting examples of feature detection algorithms include nuclei detection, cell detection, debris detection, cell type detection, and tissue type detection. One or more images may be transmitted, from optical system 124 and/or computing device 116 to second computing device 164, via any suitable electronic communication protocol, including without limitation packet-based protocols such as transfer control protocol-internet protocol (TCP-IP), file transfer protocol (FTP) or the like.

Still referring to FIG. 1, in some embodiments, a machine vision system and/or an optical character recognition system may be selected. In some embodiments, a machine vision system and/or an optical character recognition system may be used to determine one or more features of sample and/or slide 120. In a non-limiting example, an optical character recognition system may be used to identify writing on slide 120, and this may be used to annotate an image of slide 120.

Still referring to FIG. 1, in some embodiments, apparatus 100 may capture a plurality of images at differing sample focus depths. As used herein, a "sample focus depth" is a depth within a sample that an optical system is in focus. As used herein, a "focus distance" is an object side focal length. In some embodiments, first image and second image may have different focus distances and/or sample focus depths.

Still referring to FIG. 1, in some embodiments, apparatus 100 may include a machine vision system. In some embodiments, a machine vision system may include at least a camera. A machine vision system may use images, such as images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ϕ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1, in some embodiments, apparatus 100 may remove an artifact from an image. As used herein, an "artifact" is a visual inaccuracy, an element of an image that distracts from an element of interest, an element of an image that obscures an element of interest, or another undesirable element of an image.

Still referring to FIG. 1, apparatus 100 may include an image processing module. As used in this disclosure, an "image processing module" is a component designed to process digital images. In an embodiment, image processing module may include a plurality of software algorithms that can analyze, manipulate, or otherwise enhance an image, such as, without limitation, a plurality of image processing techniques as described below. In another embodiment, image processing module may include hardware components such as, without limitation, one or more graphics processing units (GPUs) that can accelerate the processing of large amount of images. In some cases, image processing module may be implemented with one or more image processing libraries such as, without limitation, OpenCV, PIL/Pillow, ImageMagick, and the like.

Still referring to FIG. 1, image processing module may be configured to receive images from optical system 124. One or more images may be transmitted, from optical system 124 to image processing module, via any suitable electronic communication protocol, including without limitation packet-based protocols such as transfer control protocol-internet protocol (TCP-IP), file transfer protocol (FTP) or the like. Receiving images may include retrieval of images from a data store containing images as described below; for instance, and without limitation, images may be retrieved using a query that specifies a timestamp that images may be required to match.

Still referring to FIG. 1, image processing module may be configured to process images. In an embodiment, image processing module may be configured to compress and/or encode images to reduce the file size and storage requirements while maintaining the essential visual information needed for further processing steps as described below. In an embodiment, compression and/or encoding of an image may facilitate faster transmission of images. In some cases, image processing module may be configured to perform a lossless compression on images, wherein the lossless compression may maintain the original image quality of images. In a non-limiting example, image processing module may utilize one or more lossless compression algorithms, such as, without limitation, Huffman coding, Lempel-Ziv-Welch (LZW), Run-Length Encoding (RLE), and/or the like to identify and remove redundancy in images without losing any information. In such embodiment, compressing and/or encoding each image of images may include converting the file format of each image into PNG, GIF, lossless JPEG2000 or the like. In an embodiment, images compressed via lossless compression may be perfectly reconstructed to the original form (e.g., original image resolution, dimension, color representation, format, and the like) of images. In other cases, image processing module may be configured to perform a lossy compression on images, wherein the lossy compression may sacrifice some image quality of images to achieve higher compression ratios. In a non-limiting example, image processing module may utilize one or more lossy compression algorithms, such as, without limitation, Discrete Cosine Transform (DCT) in JPEG or Wavelet Transform in JPEG2000, discard some less significant information within images, resulting in a smaller file size but a slight loss of image quality of images. In such embodiment, compressing and/or encoding images may include converting the file format of each image into JPEG, WebP, lossy JPEG2000, or the like.

Still referring to FIG. 1, in an embodiment, processing images may include determining a degree of quality of depiction of a region of interest of an image. In an embodiment, image processing module may determine a degree of blurriness of images. In a non-limiting example, image processing module may perform a blur detection by taking a Fourier transform, or an approximation such as a Fast Fourier Transform (FFT) of images and analyzing a distribution of low and high frequencies in the resulting frequency-domain depiction of images; for instance, and without limitation, numbers of high-frequency values below a threshold level may indicate blurriness. In another non-limiting example, detection of blurriness may be performed by convolving images, a channel of images, or the like with a Laplacian kernel; for instance, and without limitation, this may generate a numerical score reflecting a number of rapid changes in intensity shown in each image, such that a high score indicates clarity and a low score indicates blurriness. In some cases, blurriness detection may be performed using a Gradient-based operator, which measures operators based on the gradient or first derivative of images, based on the hypothesis that rapid changes indicate sharp edges in the image, and thus are indicative of a lower degree of blurriness. In some cases, blur detection may be performed using Wavelet-based operator, which takes advantage of the capability of coefficients of the discrete wavelet transform to describe the frequency and spatial content of images. In some cases, blur detection may be performed using statistics-based operators take advantage of several image statistics as texture descriptors in order to compute a focus level. In other cases, blur detection may be performed by using discrete cosine transform (DCT) coefficients in order to compute a focus level of images from its frequency content. Additionally, or alternatively, image processing module may be configured to rank images according to degree of quality of depiction of a region of interest and select a highest-ranking image from a plurality of images.

Still referring to FIG. 1, processing images may include enhancing an image or at least a region of interest via a plurality of image processing techniques to improve the quality (or degree of quality of depiction) of an image for better processing and analysis as described further in this disclosure. In an embodiment, image processing module may be configured to perform a noise reduction operation on an image, wherein the noise reduction operation may remove or minimize noise (arises from various sources, such as sensor limitations, poor lighting conditions, image compression, and/or the like), resulting in a cleaner and more visually coherent image. In some cases, noise reduction operation may be performed using one or more image filters; for instance, and without limitation, noise reduction operation may include Gaussian filtering, median filtering, bilateral filtering, and/or the like. Noise reduction operation may be done by image processing module, by averaging or filtering out pixel values in neighborhood of each pixel of an image to reduce random variations.

Still referring to FIG. 1, in another embodiment, image processing module may be configured to perform a contrast enhancement operation on an image. In some cases, an image may exhibit low contrast, which may, for example, make a feature difficult to distinguish from the background. Contrast enhancement operation may improve the contrast of an image by stretching the intensity range of the image and/or redistributing the intensity values (i.e., degree of brightness or darkness of a pixel in the image). In a non-limiting example, intensity value may represent the gray level or color of each pixel, scale from 0 to 255 in intensity range for an 8-bit image, and scale from 0 to 16,777,215 in a 24-bit color image. In some cases, contrast enhancement operation may include, without limitation, histogram equalization, adaptive histogram equalization (CLAHE), contrast stretching, and/or the like. Image processing module may be configured to adjust the brightness and darkness levels within an image to make a feature more distinguishable (i.e., increase degree of quality of depiction). Additionally, or alternatively, image processing module may be configured to perform a brightness normalization operation to correct variations in lighting conditions (i.e., uneven brightness levels). In some cases, an image may include a consistent brightness level across a region after brightness normalization operation performed by image processing module. In a non-limiting example, image processing module may perform a global or local mean normalization, where the average intensity value of an entire image or region of an image may be calculated and used to adjust the brightness levels.

Still referring to FIG. 1, in other embodiments, image processing module may be configured to perform a color space conversion operation to increase degree of quality of depiction. In a non-limiting example, in case of a color image (i.e., RGB image), image processing module may be configured to convert RGB image to grayscale or HSV color space. Such conversion may emphasize the differences in intensity values between a region or feature of interest and the background. Image processing module may further be configured to perform an image sharpening operation such as, without limitation, unsharp masking, Laplacian sharpening, high-pass filtering, and/or the like. Image processing module may use image sharpening operation to enhance the edges and fine details related to a region or feature of interest within an image by emphasizing high-frequency components within an image.

Still referring to FIG. 1, processing images may include isolating a region or feature of interest from the rest of an image as a function of plurality of image processing techniques. Images may include highest-ranking image selected by image processing module as described above. In an embodiment, plurality of image processing techniques may include one or more morphological operations, wherein the morphological operations are techniques developed based on set theory, lattice theory, topology, and random functions used for processing geometrical structures using a structuring element. A "structuring element," for the purpose of this disclosure, is a small matrix or kernel that defines a shape and size of a morphological operation. In some cases, structing element may be centered at each pixel of an image and used to determine an output pixel value for that location. In a non-limiting example, isolating a region or feature of interest from an image may include applying a dilation operation, wherein the dilation operation is a basic morphological operation configured to expand or grow the boundaries of objects (e.g., a cell, a dust particle, and the like) in an image. In another non-limiting example, isolating a region or feature of interest from an image may include applying an erosion operation, wherein the erosion operation is a basic morphological operation configured to shrink or erode the boundaries of objects in an image. In another non-limiting example, isolating a region or feature of interest from an image may include applying an opening operation, wherein the opening operation is a basic morphological operation configured to remove small objects or thin structures from an image while preserving larger structures. In a further non-limiting example, isolating a region or feature of interest from an image may include applying a closing operation, wherein the closing operation is a basic morphological operation configured to fill in small gaps or holes in objects in an image while preserving the overall shape and size of the objects. These morphological operations may be performed by image processing module to enhance the edges of objects, remove noise, or fill gaps in a region or feature of interest before further processing.

Still referring to FIG. 1, in an embodiment, isolating a region or feature of interest from an image may include utilizing an edge detection technique, which may detect one or more shapes defined by edges. An "edge detection technique," as used in this disclosure, includes a mathematical method that identifies points in a digital image, at which the image brightness changes sharply and/or has a discontinuity. In an embodiment, such points may be organized into straight and/or curved line segments, which may be referred to as "edges." Edge detection technique may be performed by image processing module, using any suitable edge detection algorithm, including without limitation Canny edge detection, Sobel operator edge detection, Prewitt operator edge detection, Laplacian operator edge detection, and/or Differential edge detection. Edge detection technique may include phase congruency-based edge detection, which finds all locations of an image where all sinusoids in the frequency domain, for instance as generated using a Fourier decomposition, may have matching phases which may indicate a location of an edge. Edge detection technique may be used to detect a shape of a feature of interest such as a cell, indicating a cell membrane or wall; in an embodiment, edge detection technique may be used to find closed figures formed by edges.

Still referring to FIG. 1, in a non-limiting example, isolating a feature of interest from an image may include determining a feature of interest via edge detection technique. A feature of interest may include a specific area within a digital image that contains information relevant to further processing as described below. In a non-limiting example, an image data located outside a feature of interest may include irrelevant or extraneous information. Such portion of an image containing irrelevant or extraneous information may be disregarded by image processing module, thereby allowing resources to be concentrated at a feature of interest. In some cases, feature of interest may vary in size, shape, and/or location within an image. In a non-limiting example feature of interest may be presented as a circle around the nucleus of a cell. In some cases, feature of interest may specify one or more coordinates, distances and the like, such as center and radius of a circle around the nucleus of a cell in an image. Image processing module may then be configured to isolate feature of interest from the image based on feature of interest. In a non-limiting example, image processing module may crop an image according to a bounding box around a feature of interest.

Still referring to FIG. 1, image processing module may be configured to perform a connected component analysis (CCA) on an image for feature of interest isolation. As used in this disclosure, a "connected component analysis (CCA)," also known as connected component labeling, is an image processing technique used to identify and label connected regions within a binary image (i.e., an image which each pixel having only two possible values: 0 or 1, black or white, or foreground and background). "Connected regions," as described herein, is a group of adjacent pixels that share the same value and are connected based on a predefined neighborhood system such as, without limitation, 4-connected or 8-connected neighborhoods. In some cases, image processing module may convert an image into a binary image via a thresholding process, wherein the thresholding process may involve setting a threshold value that separates the pixels of an image corresponding to feature of interest (foreground) from those corresponding to the background. Pixels with intensity values above the threshold may be set to 1 (white) and those below the threshold may be set to 0 (black). In an embodiment, CCA may be employed to detect and extract feature of interest by identifying a plurality of connected regions that exhibit specific properties or characteristics of the feature of interest. Image processing module may then filter plurality of connected regions by analyzing plurality of connected regions properties such as, without limitation, area, aspect ratio, height, width, perimeter, and/or the like. In a non-limiting example, connected components that closely resemble the dimensions and aspect ratio of feature of interest may be retained, by image processing module as feature of interest, while other components may be discarded. Image processing module may be further configured to extract feature of interest from an image for further processing as described below.

Still referring to FIG. 1, in an embodiment, isolating feature of interest from an image may include segmenting a region depicting a feature of interest into a plurality sub-regions. Segmenting a region into sub-regions may include segmenting a region as a function of feature of interest and/or CCA via an image segmentation process. As used in this disclosure, an "image segmentation process" is a process for partition a digital image into one or more segments, where each segment represents a distinct part of the image. Image segmentation process may change the representation of images. Image segmentation process may be performed by image processing module. In a non-limiting example, image processing module may perform a region-based segmentation, wherein the region-based segmentation involves growing regions from one or more seed points or pixels on an image based on a similarity criterion. Similarity criterion may include, without limitation, color, intensity, texture, and/or the like. In a non-limiting example, region-based segmentation may include region growing, region merging, watershed algorithms, and the like.

Still referring to FIG. 1, in some embodiments, apparatus 100 may remove an artifact identified by a machine vision system or an optical character recognition system, which are described above. Non-limiting examples of artifacts that may be removed include dust particles, bubbles, cracks in slide 120, writing on slide 120, shadows, visual noise such as in a grainy image, and the like. In some embodiments, an artifact may be partially removed and/or lowered in visibility.

Still referring to FIG. 1, in some embodiments, an artifact may be removed using an artifact removal machine learning model. In some embodiments, artifact removal machine learning model may be trained on a dataset including images, associated with images without artifacts. In some embodiments, artifact removal machine learning model may accept as an input an image including an artifact and may output an image without the artifact. For example, artifact removal machine learning model may accept as an input an image including a bubble in a slide and may output an image that does not include the bubble. In some embodiments, artifact removal machine learning model may include a generative machine learning model such as a diffusion model. A diffusion model may learn the structure of a dataset by modeling the way data points diffuse through a latent space. In some embodiments, artifact removal may be done locally. For example, apparatus 100 may include an already trained artifact removal machine learning model and may apply the model to an image. In some embodiments, artifact removal may be done externally. For example, apparatus 100 may transmit image data to another computing device and may receive an image with an artifact removed. In some embodiments, an artifact may be removed in real time. In some embodiments, an artifact may be removed based on identification by a user. For example, a user may drag a box around an artifact using a mouse cursor, and apparatus 100 may remove an artifact in the box.

Still referring to FIG. 1, in some embodiments, an algorithm which selects a region of interest, detects a focus pattern, and/or determines which regions of interest contain a sample may be selected. Such algorithms may be consistent with algorithms described in U.S. patent application Ser. No. 18/384,840, filed on Oct. 28, 2023, and titled "APPARATUS AND METHODS FOR SLIDE IMAGING," the entirety of which is incorporated herein by reference.

Still referring to FIG. 1, in some embodiments, image data may be processed using optical character recognition. In some embodiments, optical character recognition or optical character reader (OCR) includes automatic conversion of images of written (e.g., typed, handwritten or printed text) into machine-encoded text. In some cases, recognition of at least a keyword from image data may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image data. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image data to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image data. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image data.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of image data. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into at least a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIGS. 2-4. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image data. Since the adaptive classifier may have learned something useful a little too late to recognize characters on the first pass, a second pass is run over the image data. Second pass may include adaptive recognition and use characters recognized with high confidence on the first pass to recognize better remaining characters on the second pass. In some cases, two-pass approach may be advantageous for unusual fonts or low-quality image data. Another exemplary OCR software tool include OCRopus. OCRopus development is led by German Research Centre for Artificial Intelligence in Kaiserslautern, Germany. In some cases, OCR software may employ neural networks.

Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of image data. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, a language model may be used to process language, such as language recognized by an OCR function as described above. In some embodiments, an OCR function may be used to detect language in one or more images of plurality of images 148. Such language may include annotations on slide 120. In some embodiments, a language model may be used to interpret such language. As used herein, a "language model" is a program capable of interpreting natural language, generating natural language, or both. In some embodiments, a language model may be configured to interpret the output of an automatic speech recognition function and/or an OCR function. A language model may include a neural network. A language model may be trained using a dataset that includes natural language.

Still referring to FIG. 1, generating language model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, processor 104 may determine one or more language elements in OCR output by identifying and/or detecting associations between one or more language elements (including phonemes or phonological elements, morphemes or morphological elements, syntax or syntactic elements, semantics or semantic elements, and pragmatic elements) extracted from at least user data and/or response, including without limitation mathematical associations, between such words. Associations between language elements and relationships of such categories to other such term may include, without limitation, mathematical associations, including without limitation statistical correlations between any language element and any other language element and/or Language elements. Processor 104 may compare an input such as a sentence from OCR output with a list of keywords or a dictionary to identify language elements. For example, processor 104 may identify whitespace and punctuation in a sentence and extract elements comprising a string of letters, numbers or characters occurring adjacent to the whitespace and punctuation. Processor 104 may then compare each of these with a list of keywords or a dictionary. Based on the determined keywords or meanings associated with each of the strings, processor 104 may determine an association between one or more of the extracted strings and an algorithm, such as an association between a string containing the word "nucleus" and an algorithm for detecting cell nuclei. Associations may take the form of statistical correlations and/or mathematical associations, which may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory.

Still referring to FIG. 1, processor 104 may be configured to determine one or more language elements in OCR output using machine learning. For example, processor 104 may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input language elements and output patterns or conversational styles in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word, phrase, and/or other semantic unit. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Still referring to FIG. 1, processor 104 may be configured to determine one or more language elements in OCR output using machine learning by first creating or receiving language classification training data. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

Still referring to FIG. 1, language classification training data may be a training data set containing associations between language element inputs and associated language element outputs. Language element inputs and outputs may be categorized by communication form such as written language elements, spoken language elements, typed language elements, or language elements communicated in any suitable manner. Language elements may be categorized by component type, such as phonemes or phonological elements, morphemes or morphological elements, syntax or syntactic elements, semantics or semantic elements, and pragmatic elements. Associations may be made between similar communication types of language elements (e.g. associating one written language element with another written language element) or different language elements (e.g. associating a spoken language element with a written representation of the same language element). Associations may be identified between similar communication types of two different language elements, for example written input consisting of the syntactic element "that" may be associated with written phonemes /th/, /ă/, and/t/. Associations may be identified between different communication forms of different language elements. For example, the spoken form of the syntactic element "that" and the associated written phonemes above. Language classification training data may be created using a classifier such as a language classifier. An exemplary classifier may be created, instantiated, and/or run using processor 104, or another computing device. Language classification training data may create associations between any type of language element in any format and other type of language element in any format. Additionally, or alternatively, language classification training data may associate language element input data to a feature related to an algorithm. For example, language classification training data may associate occurrences of the syntactic elements "find," and "cells" in a single sentence with an algorithm for identifying cells in an image.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) \ P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Still referring to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Still referring to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, apparatus 100 may select algorithm 160. In some embodiments, algorithm 160 may be selected as a function of a user input. For example, a user may select preferences for which algorithms are selected and apparatus 100 may select algorithm 160 according to those preferences. In another example, algorithm 160 may be selected as a function of historical user inputs. In some embodiments, algorithm 160 may be selected using rule based decision making. Algorithm 160 may be selected using a decision tree. Algorithm 160 may be selected using a machine learning model, such as a machine learning model trained on past user inputs. In some embodiments, algorithm 160 may be selected as a function of one or more images from plurality of images 148, such as first image 152. In some embodiments, algorithm 160 may be selected as a function of metadata associated with one or more images of plurality of images 148. For example, metadata may include an instruction as to an algorithm to select and/or apply to one or more images of plurality of images 148. In some embodiments, algorithm 160 may be selected based on an annotation on slide 120. Such an annotation may be captured in first image 152 and read using an OCR process. An OCR output may be interpreted using a language model, as described above, in order to identify algorithm 160. An annotation may indicate which algorithm to apply, and apparatus 100 may select that algorithm. For example, an annotation may say to identify cells of a particular type, and apparatus 100 may select algorithm 160 that identifies cells of that type. An annotation may identify a feature of a sample on slide 120, and algorithm 160 may be selected based on that feature. For example, an annotation may indicate that a sample contains a particular type of cell, and algorithm 160 may be selected such that it identifies cells of that type, identifies cells of other types, counts cells of that type, counts cells of other types, or the like. In another example, an annotation may indicate cells of a particular type, and a first algorithm may identify cells of that type, and a second algorithm may contribute to producing a clearer image of a section of slide 120 containing cells of that type. For example, algorithm 160 may identify a region containing those cells as a region of interest, algorithm 160 may identify z-stack data which should be retained in order to capture a clear image of a region of interest, or algorithm 160 may produce an output configuring apparatus 100 to capture a more zoomed in image of a region of interest containing cells of the desired type. In some embodiments, annotations on slide 120 may be converted into metadata associated with one or more images of plurality of images 148, and both images and metadata may be factors for selecting algorithm 160. In some embodiments, algorithm 160 may be selected automatically. This may occur while apparatus 100 is still capturing images of plurality of images 148. Algorithm 160 may then be run on one or more images of plurality of images 148, as described below. Output of algorithm 160 may be used to improve further image capture, as described below. In some embodiments, multiple algorithms are selected. In some embodiments, an algorithm described with reference to FIGS. 5-8 is selected.

Still referring to FIG. 1, apparatus 100 may identify control command 168 as a function of an image of plurality of images 148. For example, computing device 116 may identify control command 168. Apparatus 100 may identify control command 168 as a function of first image 152 and/or one or more additional images of plurality of images 148. As used herein, a "control command" is a specific instruction or set of instructions which controls whether a subsequent image is taken, a manner in which a subsequent image is taken, whether data from prior images is retained, or a combination of these. In some embodiments, control command 168 is identified before all of plurality of images 148 has been captured. In some embodiments, control command 168 may be identified upon execution of selected algorithm and/or as a function of selected algorithm.

Still referring to FIG. 1, algorithm 160 may be an element of party computer program. Such a program may be installed on first computing device 116 and/or second computing device 164. Algorithm 160 may be containerized on apparatus 100. As used herein, a "container" is an executable package of computer software that includes all necessary elements needed to run it in any software operating environment. Such computer software may include algorithm 160. For example, and without limitation, a container may include code, runtime, system tools, system libraries, configurations, and/or the like. In some embodiments, a container may include a standard unit of software that packages up code and all its dependencies so that it may be run under a desired performance from one software operating environment to another. In some embodiments, a computing device may include multiple containers. Containers may be isolated such that execution of algorithm 160 may have minimal effect on other operations of a computing device which may include, for example, controlling operations of optical system 124 and/or actuator mechanism 132. In some embodiments, this may allow operation of other aspects of a computing device to remain operational in the event of an error and/or unauthorized access associated with algorithm 160. In some embodiments, a containerized algorithm may be easily moved from one computing device to another. In some embodiments, a containerized algorithm may be transmitted between first computing device 116 to second computing device 164 and/or a third computing device. Such third computing device may include, for example, a computing device configured to operate with a second optical system.

Still referring to FIG. 1, in some embodiments, control command 168 may control whether a subsequent image is taken. For example, an algorithm may identify a region of interest in first image 152, and this output may be used to determine that second image 156 should be taken, where second image 156 is a zoomed in, high resolution image of at least a section of the region of interest. In another example, an algorithm may identify a region of interest in first image 152, and this output may be used to determine that a plurality of additional images should be taken, where these additional images make up a z-stack, which may be used to determine an optimal level of focus in at least a section of the region of interest.

Still referring to FIG. 1, in some embodiments, control command 168 may control a manner in which a subsequent image is taken. For example, an algorithm may identify a region of interest in first image 152, and this output may be used to determine one or more parameters of a subsequent image taken of the region of interest. Parameters may include magnification, focus, position, aperture, shutter speed, and the like.

Still referring to FIG. 1, in some embodiments, control command 168 may control whether data from prior images is retained. For example, an algorithm may identify a region of interest in first image 152, and this output may be used to determine whether image data from a previously captured z-stack is retained. For example, a first z-stack captured within the region of interest may be retained, whereas a second z-stack captured elsewhere may not be retained. Additional control commands are described below with reference to FIGS. 5-8.

Still referring to FIG. 1, in some embodiments, identifying control command 168 may include transmitting control command 168 to a second computing device 164. Second computing device 164 may be configured to perform and/or execute algorithm 160. As used herein, a "second computing device" is a computing device which applies an algorithm to an image. Second computing device may include, in non-limiting examples, a desktop computer, a laptop computer, or a computer on the cloud. Second computing device 164 may be configured to perform algorithm 160. First computing device 116 may be communicatively connected to second computing device 164. First computing device 116 may be communicatively connected to second computing device 164 using a physical connection such as a cable. First computing device 116 and second computing device 164 may be physically present in the same location. First computing device 116 and second computing device 164 may be on the same local network. First computing device 116 and second computing device 164 may be in separate locations. First computing device 116 and second computing device 164 may be communicatively connected through the internet.

Still referring to FIG. 1, in some embodiments, multiple sets of images are transmitted to second computing device 164. For example, optical system 124 may capture several images in sequence, and they may be transmitted as they are captured.

Still referring to FIG. 1, in some embodiments, identifying control command 168 may include receiving control command 168 from second computing device 164. In some embodiments, control command may include a response to a web request. In some embodiments, control command may be sent using an electronic communication protocol, including without limitation packet-based protocols such as transfer control protocol-internet protocol (TCP-IP), file transfer protocol (FTP) or the like.

Still referring to FIG. 1, apparatus 100 may capture second image 156 of plurality of images 148 as a function of control command 168. In some embodiments, multiple images of plurality of images 148 are captured as a function of control command 168. In some embodiments, at least one image of plurality of images 148 is captured, algorithm 160 is selected, and control command 168 is identified prior to completing capturing plurality of images 148. Apparatus 100 may set image parameters such as magnification, focus, position, aperture, shutter speed, and the like according to control command 168. Computing device 116 may configure optical system 124 to capture a second image of the slide at the slide port through the at least an optical sensor as a function of control command 168.

Still referring to FIG. 1, in some embodiments, apparatus 100 may determine a parameter set as a function of control command 168. As used herein, a "parameter set" is a set of values that identify how an image is to be captured. A parameter set may be implemented as a data structure as described below. A parameter set may include X and Y coordinates indicating a location of an image. A parameter set may include a level of magnification. As used herein, a "level of magnification" is a datum describing how zoomed in or out an image is to be captured at. A level of magnification may account for optical zoom and/or digital zoom. As a non-limiting example, a level of magnification may be "8×" magnification. A parameter set may include a sample focus depth and/or focus distance. As used herein, unless indicated otherwise, an "X coordinate" and a "Y coordinate" refer to coordinates along perpendicular axes, where the plane defined by these axes is parallel to a plane of a surface of slide 120. In some cases, setting a magnification may include changing one or more optical elements within optical system. For example, setting a magnification may include replacing a first objective lens for a second objective lens having a different magnification. Additionally, or alternative, one or more optical components "down beam" from objective lens may be replaced to change a total magnification of optical system and, thereby, set a magnification. In some cases, setting a magnification may include changing a digital magnification. Digital magnification may include outputting an image, using output interface, at a different resolution, i.e., after re-scaling the image. In some embodiments, apparatus 100 may capture an image with a particular field of view. A field of view may be determined based on, for example, a level of magnification, and how wide of an angle a camera captures images at.

Still referring to FIG. 1, in some embodiments, apparatus 100 may move one or more of slide port 128, slide 120, and at least an optical system 124 into a second position in order to capture second image 156 as a function of control command 168. In some embodiments, the location of a second position may be based on a parameter set. Second position may be determined by, for example, modifying the position of optical system 124 relative to slide 120 based on parameter set. For example, parameter set may indicate that second position is achieved by modifying an X coordinate by 5 mm in a particular direction. In this example, second position may be found by modifying optical system's original position by 5 mm in that direction. In some embodiments, such movement may be done using actuator mechanism 132. In some embodiments, actuator mechanism 132 may move slide port 128 such that slide 120 is in a position relative to at least an optical system 124 such that optical system 124 may capture an image as directed by parameter set. For example, slide 120 may rest on slide port 128 and movement of slide port 128 may move slide 120 as well. In some embodiments, actuator mechanism 132 may move slide 120 such that slide 120 is in a position relative to at least an optical system 124 such that optical system 124 may capture an image as directed by parameter set. For example, slide 120 may be connected to actuator mechanism 132 such that actuator mechanism 132 may move slide 120 relative to at least an optical system 124. In some embodiments, actuator mechanism 132 may move at least an optical system 124 such that slide 120 is in a position relative to slide 120 such that optical system 124 may capture an image as directed by parameter set. For example, slide 120 may be stationary, and actuator mechanism 132 may move at least an optical system 124 into position relative to slide 120. In some embodiments, actuator mechanism 132 may move more than one of slide port 128, slide 120, and at least an optical system 124 such that they are in the correct relative positions. In some embodiments, actuator mechanism 132 may move slide port 128, slide 120, and/or at least an optical system 124 in real time.

Still referring to FIG. 1, in some embodiments, second image 156 is an image taken immediately after first image 152. In some embodiments, processing steps may take time such that one or more images are captured between first image 152 and second image 156. In some embodiments, defaults may be used for images captured before data from first image 152 is analyzed and control command 168 is determined. In some embodiments, 1, 2, 3, 4, 5, 6, 7, 8, 9, 10, or more images are taken between first image 152 and second image 156. In some embodiments, data from more than one image may be used when determining control command 168. In some embodiments, control command 168 may be used to capture more than one of plurality of images 148. In some embodiments, system 100 waits until control command 168 is ready before continuing with a scanning process.

Still referring to FIG. 1, use of control command 168 may improve many aspects of second image 156 based on which algorithm 160 is selected. For example, identification of a region of interest may allow apparatus 100 to set parameters such as magnification and position such that second image 156 is captured within the region of interest.

Still referring to FIG. 1, in some embodiments, apparatus 100 may display an image to a user. In some embodiments, first image may be displayed to a user in real time. In some embodiments, an image may be displayed to a user using output interface 144. For example, first image may be displayed to a user a display such as a screen. In some embodiments, one or more images of plurality of images 148 may be displayed to a user. For example, first image 152 and/or second image 156 may be displayed to a user. An image may be displayed to a user in the context of a graphical user interface (GUI). For example, a GUI may include controls for navigating an image such as controls for zooming in or out or changing where is being viewed. A GUI may include a touchscreen.

Still referring to FIG. 1, in some embodiments, a hybrid image formed from multiple images of plurality of images 148 may be displayed to a user. As used herein, a "hybrid image" is an image constructed by combining a plurality of images. In some embodiments, creation of a hybrid image may preserve one or more images. For example, if second image 156 covers a smaller area at a higher resolution per unit area than first image 152, then second image 156 may replace a lower resolution per unit area segment of first image 152 corresponding to the region covered by second image 156. In some embodiments, image adjustments may be made to offset visual differences between combined images at a border of two or more images in hybrid image. In a non-limiting example, color may be adjusted such that background color of the images is consistent along the border of the images. As another non-limiting example, brightness of the images may be adjusted such that there is no stark difference between brightness of the images.

Still referring to FIG. 1, in some embodiments, apparatus 100 may transmit first image, second image, hybrid image, and/or a data structure including a plurality of images to an external device. Such an external device may include, in non-limiting examples, a phone, tablet, or computer. In some embodiments, such a transmission may configure the external device to display an image.

Still referring to FIG. 1, in some embodiments, apparatus 100 may determine a visual element data structure. In some embodiments, apparatus 100 may display to a user a visual element as a function of visual element data structure. As used herein, a "visual element data structure" is a data structure describing a visual element. As non-limiting examples, visual elements may include first image, second image, hybrid image, and elements of a GUI.

Still referring to FIG. 1, in some embodiments, a visual element data structure may include a visual element. As used herein, a "visual element" is a datum that is displayed visually to a user. In some embodiments, a visual element data structure may include a rule for displaying visual element. In some embodiments, a visual element data structure may be determined as a function of first image, second image, and/or hybrid image. In some embodiments, a visual element data structure may be determined as a function of an item from the list consisting of first image 152, second image 156, hybrid image, plurality of images 148, algorithm 160, control command 168, a GUI element, and an output of an OCR function. In a non-limiting example, a visual element data structure may be generated such that visual element describing a feature of first image, such as an annotation, is displayed to a user.

Still referring to FIG. 1, in some embodiments, visual element may include one or more elements of text, images, shapes, charts, particle effects, interactable features, and the like. As a non-limiting example, a visual element may include a touch screen button for displaying a text file created by an OCR function.

Still referring to FIG. 1, a visual element data structure may include rules governing if or when visual element is displayed. In a non-limiting example, a visual element data structure may include a rule causing a parameter set used to capture an image to be displayed when a user selects a specific image using a GUI.

Still referring to FIG. 1, a visual element data structure may include rules for presenting more than one visual element, or more than one visual element at a time. In an embodiment, about 1, 2, 3, 4, 5, 10, 20, or 50 visual elements are displayed simultaneously. For example, a plurality of images may be displayed simultaneously.

Still referring to FIG. 1, in some embodiments, apparatus 100 may transmit visual element to a display such as output interface 144. A display may communicate visual element to user. A display may include, for example, a smartphone screen, a computer screen, or a tablet screen. A display may be configured to provide a visual interface. A visual interface may include one or more virtual interactive elements such as, without limitation, buttons, menus, and the like. A display may include one or more physical interactive elements, such as buttons, a computer mouse, or a touchscreen, that allow user to input data into the display. Interactive elements may be configured to enable interaction between a user and a computing device. In some embodiments, a visual element data structure is determined as a function of data input by user into a display.

Still referring to FIG. 1, a variable and/or datum described herein may be represented as a data structure. In some embodiments, a data structure may include one or more functions and/or variables, as a class might in object-oriented programming. In some embodiments, a data structure may include data in the form of a Boolean, integer, float, string, date, and the like. In a non-limiting example, an annotation data structure may include a string value representing text of the annotation. In some embodiments, data in a data structure may be organized in a linked list, tree, array, matrix, tenser, and the like. In a non-limiting example, annotation data structures may be organized in an array. In some embodiments, a data structure may include or be associated with one or more elements of metadata. A data structure may include one or more self-referencing data elements, which processor 104 may use in interpreting the data structure. In a non-limiting example, a data structure may include "<date>" and "</date>," tags, indicating that the content between the tags is a date.

Still referring to FIG. 1, a data structure may be stored in, for example, memory 108 or a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, in some embodiments, a data structure may be read and/or manipulated by processor 104. In a non-limiting example, an image data structure may be read and displayed to user. In another non-limiting example, an image data structure may be read to identify text using an OCR function, as described above.

Still referring to FIG. 1, in some embodiments, a data structure may be calibrated. In some embodiments, a data structure may be trained using a machine learning algorithm. In a non-limiting example, a data structure may include an array of data representing the biases of connections of a neural network. In this example, the neural network may be trained on a set of training data, and a back propagation algorithm may be used to modify the data in the array. Machine learning models and neural networks are described further herein.

One or more features of apparatus 100 may be consistent with a feature disclosed in one or more of (A) U.S. patent application Ser. No. 18/217,378, filed on Jul. 25, 2023, and titled "APPARATUS AND A METHOD FOR DETECTING ASSOCIATIONS AMONG DATASETS OF DIFFERENT TYPES," the entirety of which is hereby incorporated by reference; (B) U.S. patent application Ser. No. 18/226,017, filed on Jul. 25, 2023, and titled "APPARATUS AND A METHOD FOR GENERATING A CONFIDENCE SCORE ASSOCIATED WITH A SCANNED LABEL," the entirety of which is hereby incorporated by reference; (C) U.S. patent application Ser. No. 18/226,058, filed on Jul. 25, 2023 and titled "IMAGING DEVICE AND A METHOD FOR IMAGE GENERATION OF A SPECIMEN," the entirety of which is hereby incorporated by reference; (D) U.S. patent application Ser. No. 18/226,100, filed on Jul. 25, 2023 and titled "APPARATUS AND METHODS FOR REAL-TIME IMAGE GENERATION," the entirety of which is hereby incorporated by reference; (E) U.S. patent application Ser. No. 18/384,840, filed on Oct. 28, 2023, and titled "APPARATUS AND METHODS FOR SLIDE IMAGING," the entirety of which is hereby incorporated by reference; and (F) U.S. patent application Ser. No. 18/382,769, filed on Oct. 23, 2023, and titled "SYSTEM AND METHOD OF DIGITALIZING A SLIDE," the entirety of which is hereby incorporated by reference.

Figure 2:
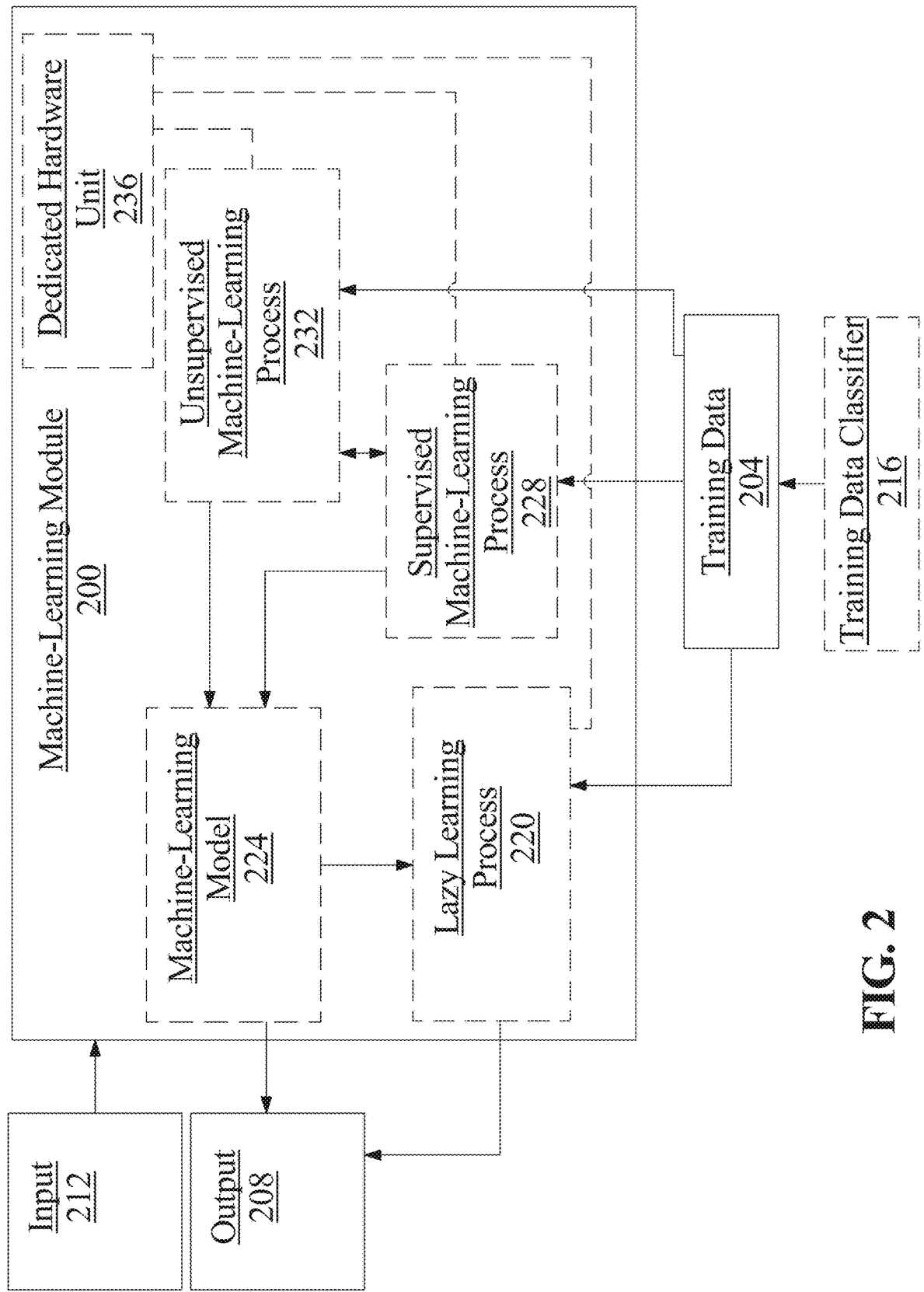
FIG. 2 is a diagram depicting an exemplary machine learning model.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example, inputs may include images, and outputs may include text read from the image using an OCR machine learning model.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to whether or not a sample is present.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include images of regions of interest as described above as inputs, determinations as to whether a sample is present as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
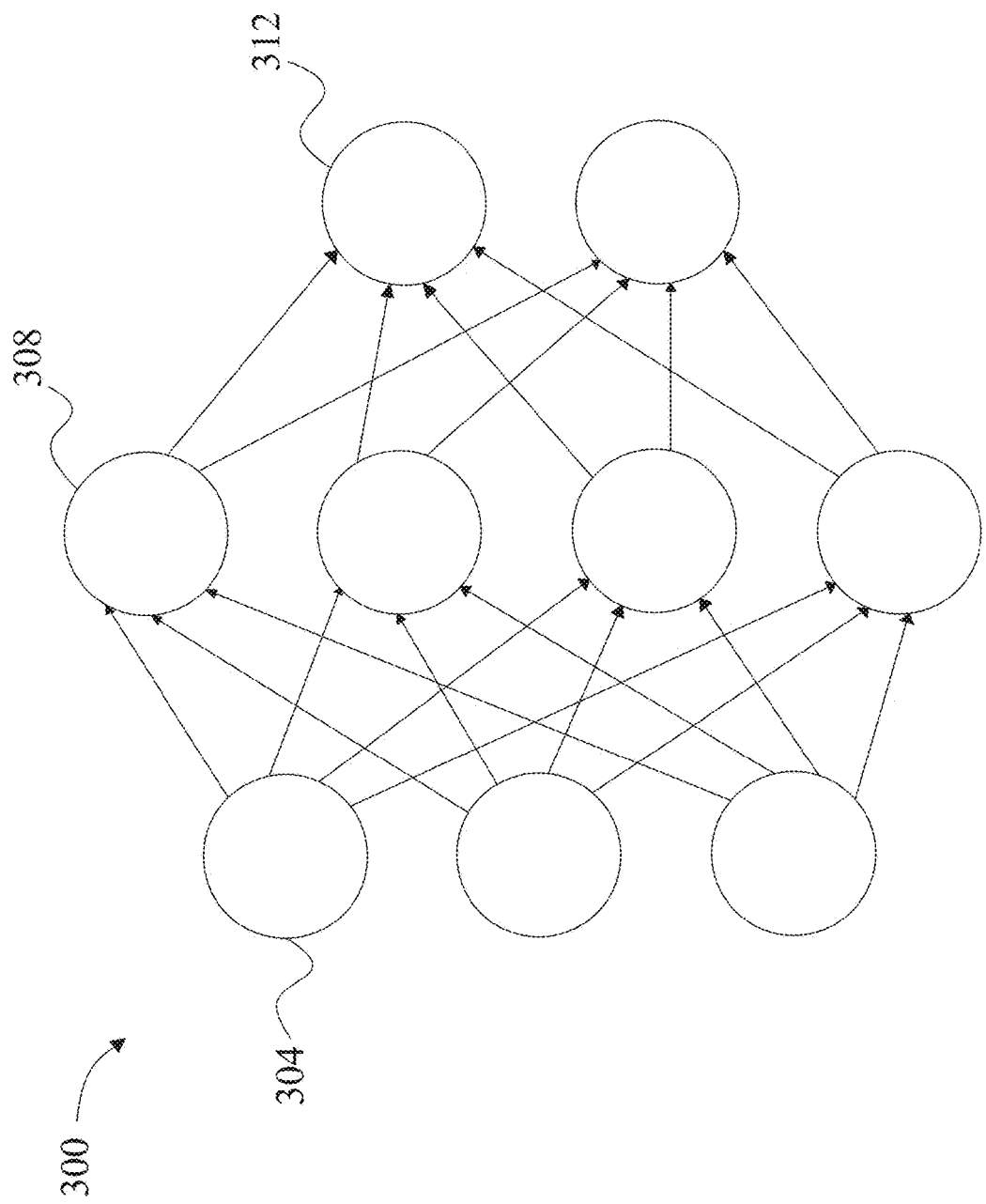
FIG. 3 is a diagram depicting an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
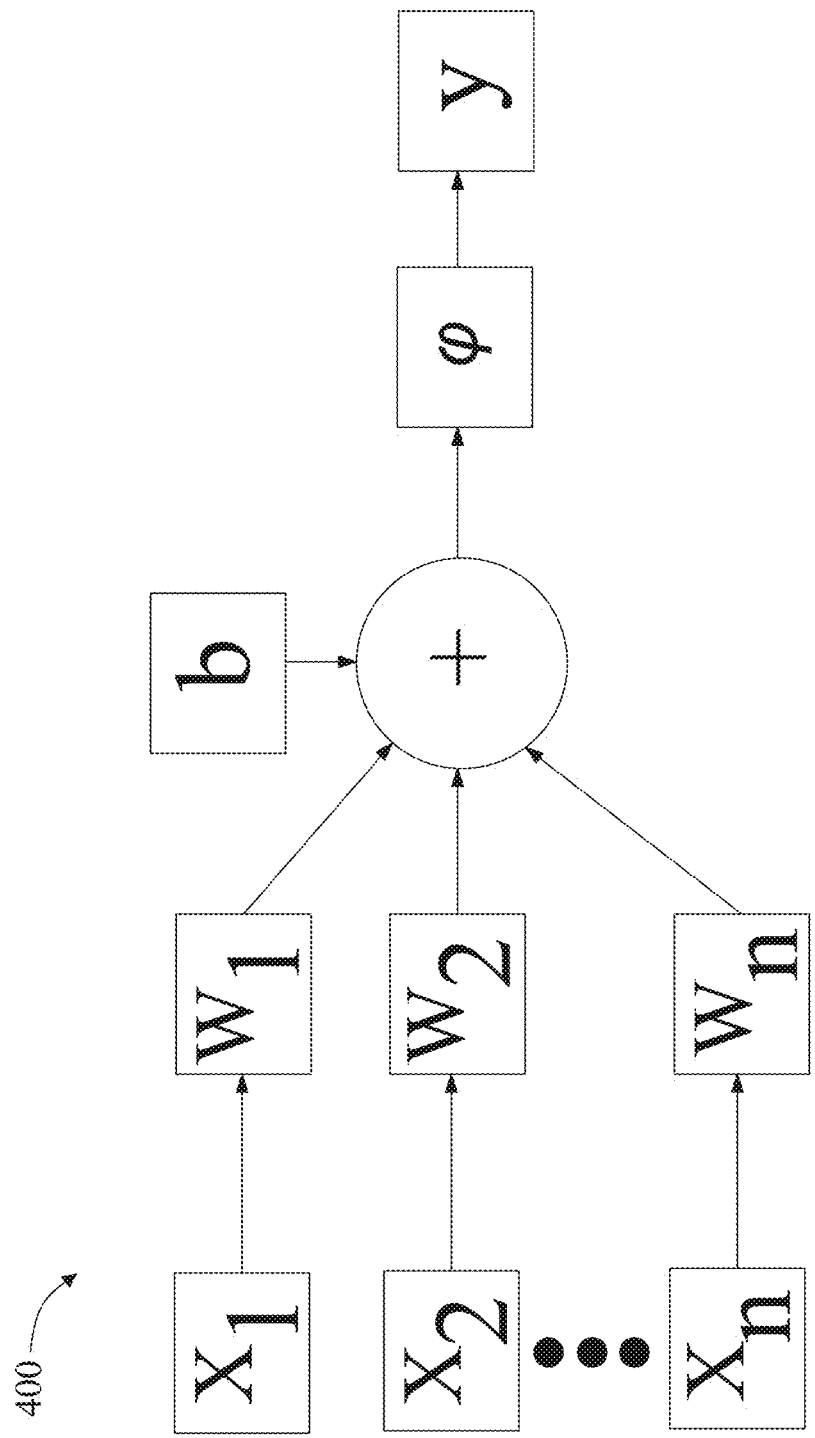
FIG. 4 is a diagram depicting an exemplary neural network node.

Referring now to FIG. 4, an exemplary embodiment of a node 400 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are xi, a swish function such as $f(x)=x*\text{sigmoid}(x)$, a Gaussian error linear unit function such as f(x)=a(1+tanh ($\sqrt{2/\pi}$(x+bx$^r$))) for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function p, which may generate one or more outputs y. Weight w, applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Still referring to FIG. 4, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Still referring to FIG. 4, in some embodiments, a convolutional neural network may learn from images. In non-limiting examples, a convolutional neural network may perform tasks such as classifying images, detecting objects depicted in an image, segmenting an image, and/or processing an image. In some embodiments, a convolutional neural network may operate such that each node in an input layer is only connected to a region of nodes in a hidden layer. In some embodiments, the regions in aggregate may create a feature map from an input layer to the hidden layer. In some embodiments, a convolutional neural network may include a layer in which the weights and biases for all nodes are the same. In some embodiments, this may allow a convolutional neural network to detect a feature, such as an edge, across different locations in an image.

Figure 5:
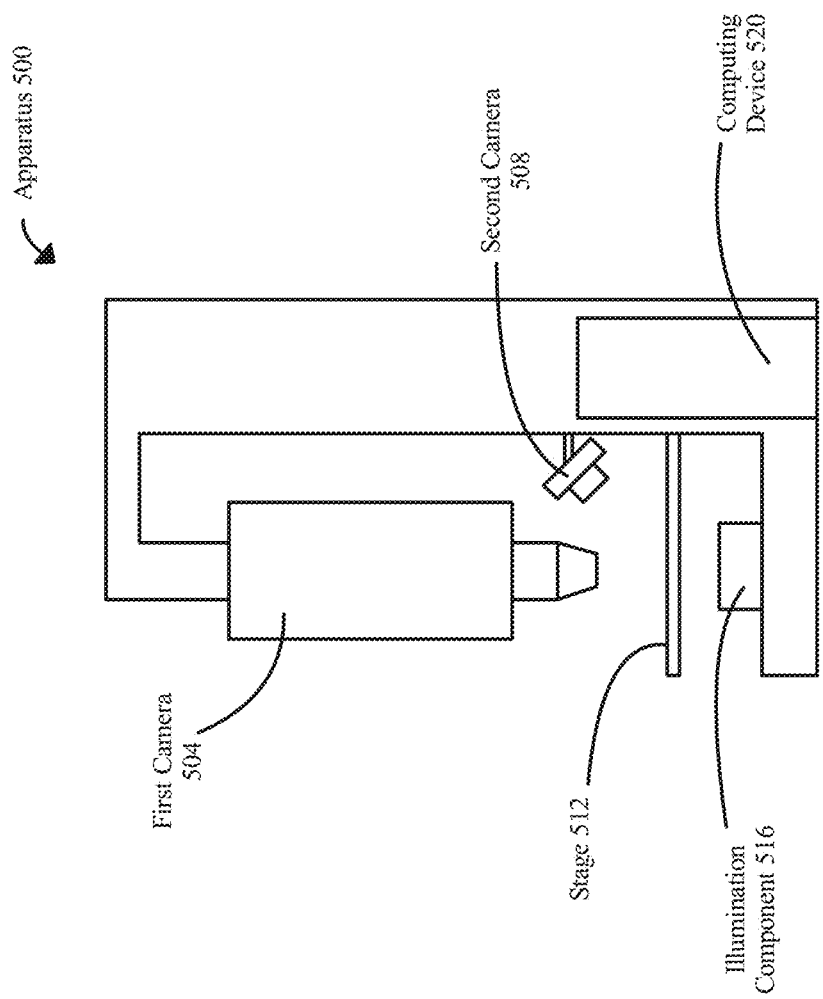
FIG. 5 is a diagram depicting an exemplary apparatus for slide imaging.

Referring now to FIG. 5, an exemplary embodiment of apparatus 500 is depicted. Apparatus 500 may include first camera 504. First camera 504 may include a camera configured to take high resolution, high magnification images. Apparatus 500 may include second camera 508. Second camera 508 may include a camera configured to take wide field of view images, such as images covering the entirety of a slide. In some embodiments, images of plurality of images 148 may be taken using first camera 504 and/or second camera 508. For example, first image 152 may be taken using second camera 504 and second image 156 may be taken using first camera 504. Apparatus 500 may include stage 512. A slide, such as slide 120, may be placed upon stage 512. Stage 512 may include slide port 128. Apparatus 516 may include illumination component 516. Illumination component 516 may provide lighting to a slide on stage 512. In some embodiments, illumination component 516 may be positioned such that a slide is backlit with respect to one or more cameras. Apparatus 500 may include computing device 520. Computing device 520 may perform one or more functions described herein, such as selecting an algorithm, running an algorithm, and/or producing a control command. In some embodiments, computing device 520 performs a method according to FIG. 6.

Figure 6:
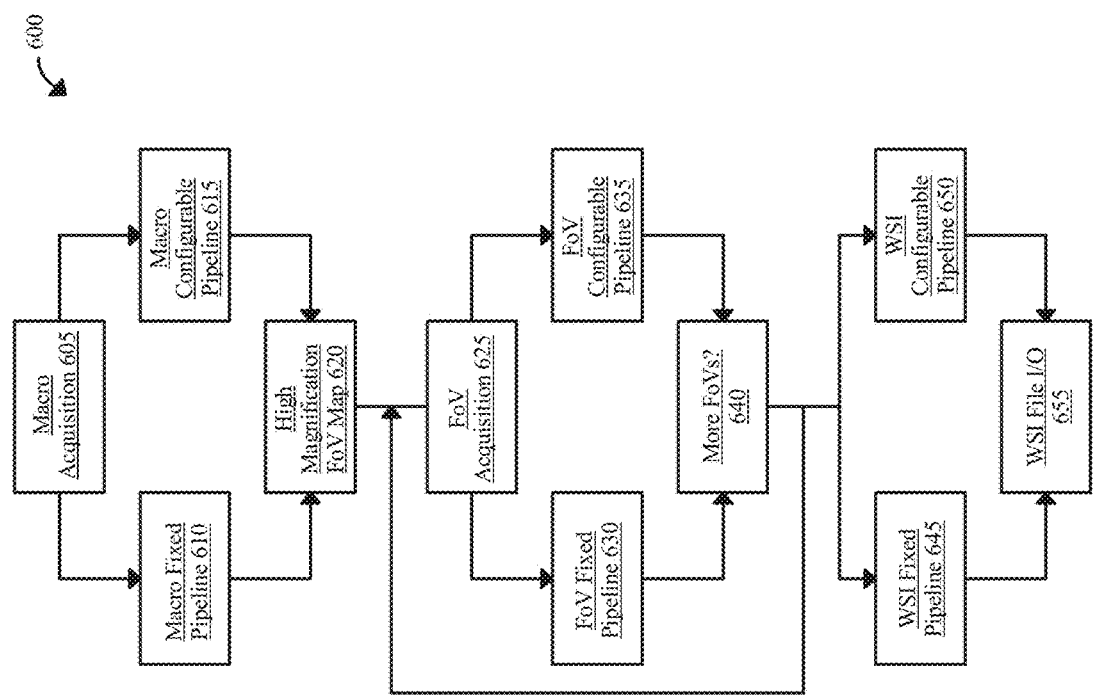
FIG. 6 is a diagram depicting an exemplary method of slide imaging.

Referring now to FIG. 6, an exemplary embodiment of method 600 is depicted. Method 600 may include macro acquisition 605. Macro acquisition 605 may be performed using macro fixed pipeline 610 and/or macro configurable pipeline 615. Macro fixed pipeline 610 and macro configurable pipeline 615 may be alternative methods for capturing a wide angle image of a slide and determining parameters for capturing higher resolution and/or higher magnification images of the slide. Macro fixed pipeline 610 may use default settings. For example, macro fixed pipeline may include determining parameters such that high resolution images are captured covering an entire slide are captured. Macro fixed pipeline 610 may perform macro imaging, slide label data extraction, tissue localization on slide, and/or determine parameters for micro imaging. Macro configurable pipeline 615 may include use of a control command determined as described above in determining parameters. For example, macro configurable pipeline 615 may include analysis of a first image to determine a location of a region of interest, and setting parameters such that high resolution images are only captured of the region of interest. In some embodiments, one or more functions of macro fixed pipeline 610 may be made configurable in macro configurable pipeline 615. For example, macro imaging may be performed using a low magnification objective lens, and using it to create a low resolution panorama for use in tissue localization and determining imaging parameters for micro imaging. Macro fixed pipeline 610 and/or macro configurable pipeline 615 may produce high magnification FoV map 620.

Still referring to FIG. 6, method 600 may include field of view (FoV) acquisition 625. FoV acquisition 625 may be performed using FoV fixed pipeline 630 and/or FoV configurable pipeline 635. FoV fixed pipeline 630 and FoV configurable pipeline 635 may be alternative methods for determining a focus pattern for at least a segment of a slide. For example, FoV configurable pipeline 615 may include determining a focus pattern for a region where one or more features are detected. For example, a section of a sample may include cells and/or tissues of a particular type, and FoV configurable pipeline 635 may focus resources on determining a focus pattern for that section of a sample. FoV fixed pipeline 630 may use a default setting, such as producing a focus pattern for an entire slide or an entire region of interest. Steps 625, 630, and/or 635 may repeat until all relevant FoVs have been covered. Steps 625, 630, and/or 635 may also include capturing a plurality of images and stitching together those images to create a hybrid image. In some embodiments, FoV configurable pipeline 635 may perform one or more functions beyond those of FoV fixed pipeline 630. For example, FoV configurable pipeline 635 may run feature and object detection algorithms apart from fixed components, save a Z-stack at a specific FoV, and/or scan and save data from multiple objectives. For example, FoV configurable pipeline 635 may scan and save data from 40× and 80× objectives.

Still referring to FIG. 6, method 600 may include use of whole slide imaging (WSI) fixed pipeline 645 and/or WSI configurable pipeline 650 to complete hybrid image. WSI fixed pipeline 645 and WSI configurable pipeline 650 may be alternative methods which may completion of stitching images together to produce a hybrid image, and/or a quality control assessment of hybrid image. Method 600 may further include file formatting and input/output (I/O) tasks 655. Processes performed in WSI fixed pipeline 645 may include stitching, color adjustment, panorama tiling, and/or file I/O. Processes performed in WSI configurable pipeline 650 may include one or more processes of WSI fixed pipeline 645, which may be made configurable. For example, WSI configurable pipeline 650 may perform slide metadata based custom color adjustment. In another example, WSI configurable pipeline 650 may write WSI in a custom file format for file I/O.

Figure 7:
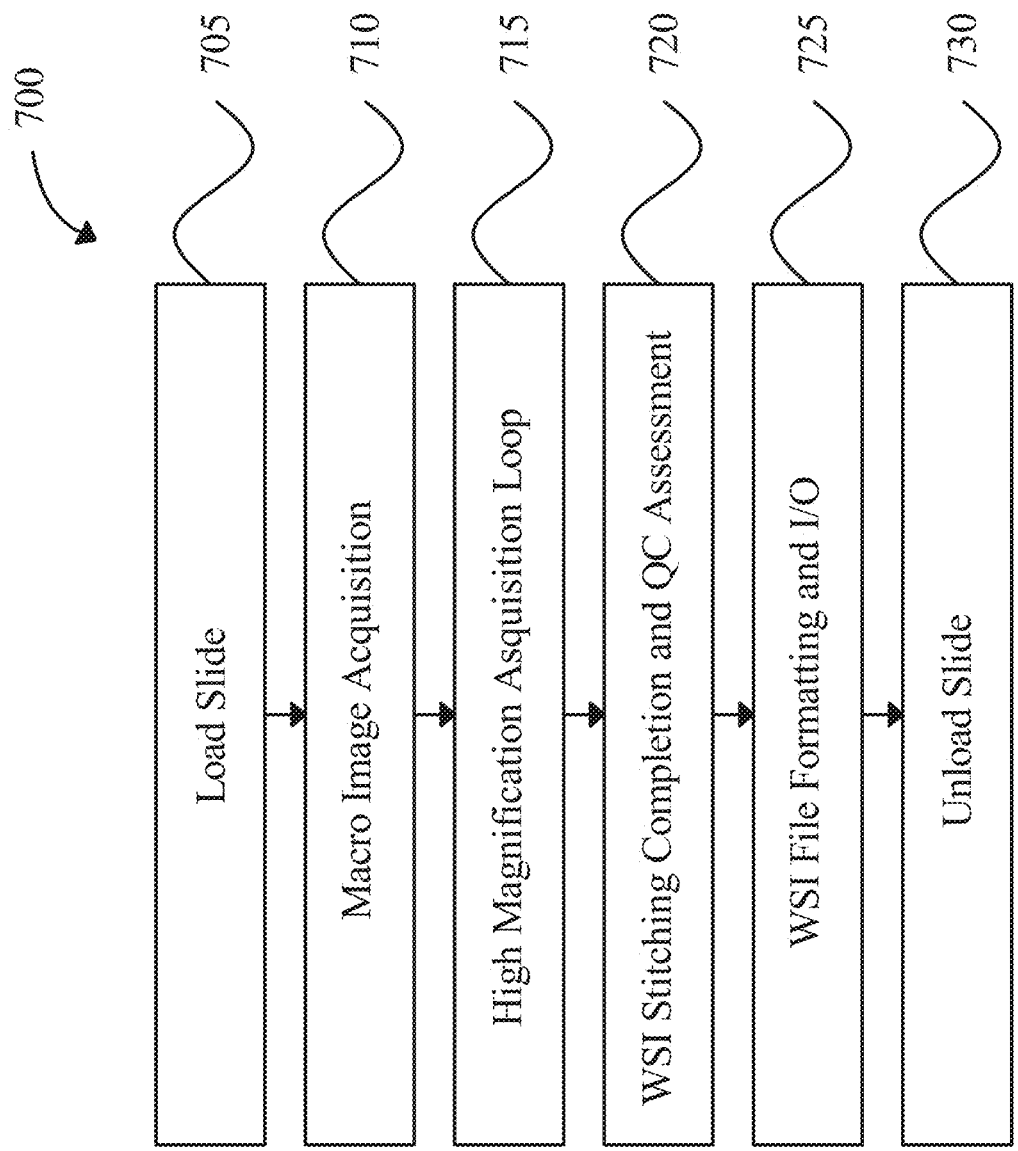
FIG. 7 is a diagram depicting an exemplary method of slide imaging.

Referring now to FIG. 7, an exemplary embodiment of method 700 is depicted. Method 700 may include loading a slide 705. Method 700 may further include macro image acquisition 710. Macro image acquisition may include acquiring a macro image, such as an image of an entire slide. Macro image acquisition may further include localizing tissue, and/or determining high magnification acquisition parameters. Method 700 may further include a high magnification acquisition loop step 715. High magnification acquisition loop may include acquiring an FoV, an FoV quality control step, a WSI stitching compute step, adjusting acquisition parameters, and/or moving to another FoV, if there is another FoV that has not yet been covered. Method 700 may further include a WSI stitching completion and quality control step 720. Step 720 may include use of all FoVs from earlier steps. Method 700 may further include a WSI file formatting and I/O step 725. Method 700 may further include unloading a slide 730.

Figure 8:
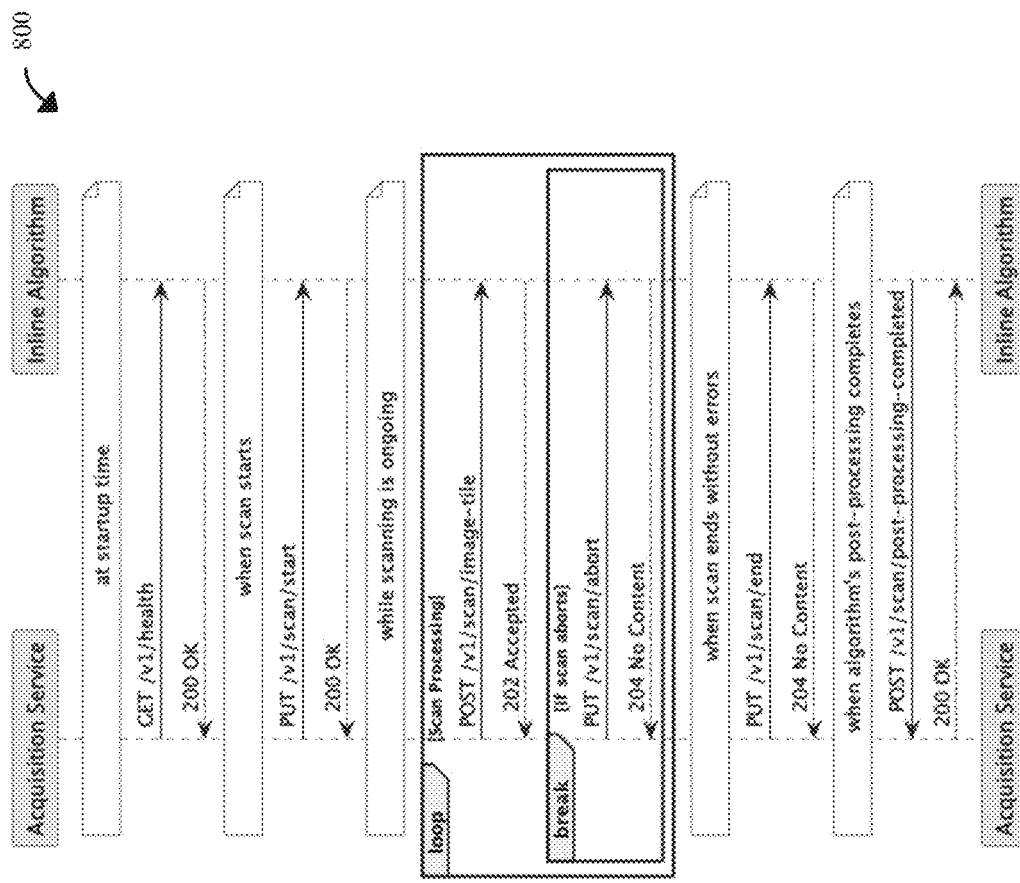
FIG. 8 is a chart depicting exemplary communications between an acquisition service and an inline algorithm.

Referring now to FIG. 8, chart 800 depicting exemplary communication between an acquisition service and an inline algorithm is depicted. An acquisition service may include a computing device capable of capturing images of a slide using a camera, as described above. An inline algorithm may be performed on this computing device or another separate computing device. An acquisition service may input into the inline algorithm a datum configuring the inline algorithm to report back its status. An acquisition service may input into the inline algorithm a datum indicating that a scan has started. An acquisition service may input into the inline algorithm one or more image files, which may include metadata as described above with reference to FIG. 1. An acquisition service may input into the inline algorithm a datum indicating that a scan has aborted. An acquisition service may input into the inline algorithm a datum indicating that a scan has ended without errors. An inline algorithm may transmit to the acquisition service a datum indicating that the inline algorithm has completed and/or associated data, such as an output of the inline algorithm.

Figure 9:
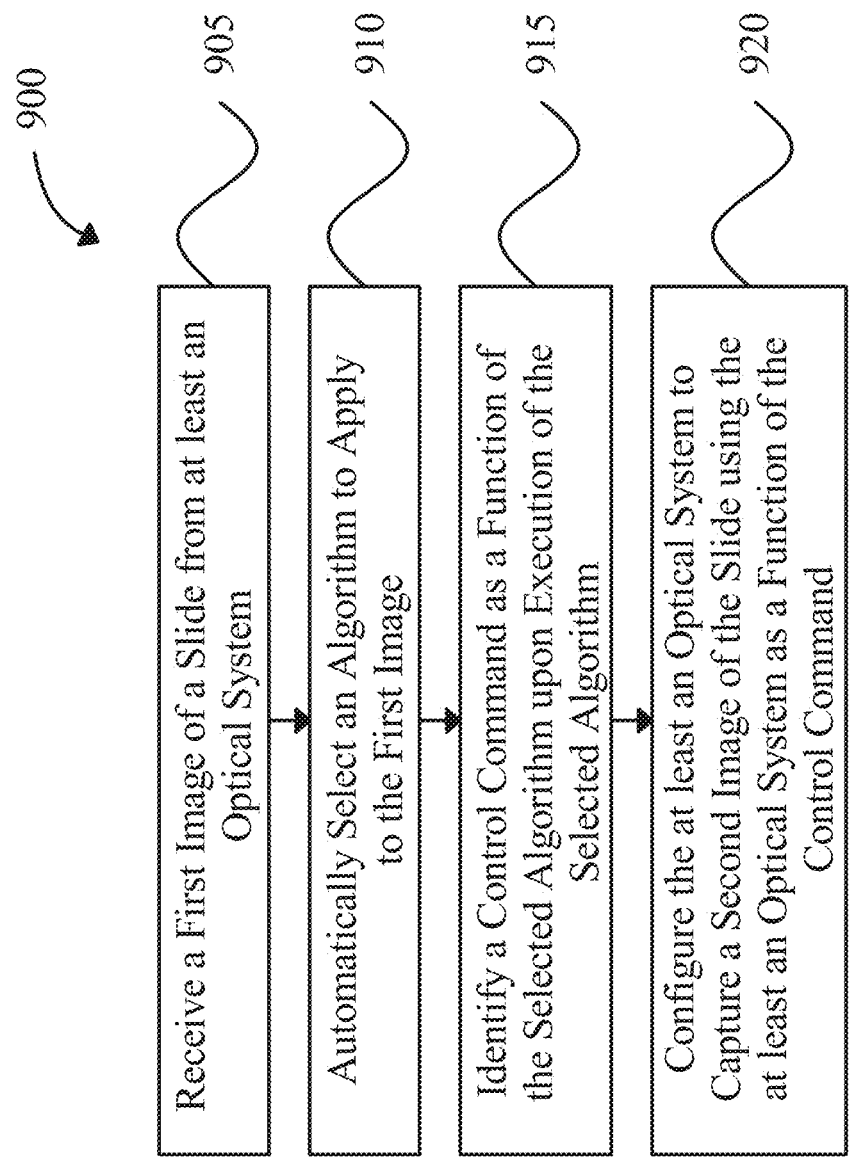
FIG. 9 is a diagram depicting an exemplary method of slide imaging.

Referring now to FIG. 9, an exemplary embodiment of a method 900 of slide imaging is illustrated. One or more steps of method 900 may be implemented, without limitation, as described herein in reference to other figures. One or more steps of method 900 may be implemented, without limitation, using at least a processor.

Still referring to FIG. 9, in some embodiments, method 900 may include receiving a first image of a slide from at least an optical system 905.

Still referring to FIG. 9, in some embodiments, method 900 may include automatically selecting at least an algorithm to apply to the first image 910. In some embodiments, the algorithm is selected as a function of metadata associated with the first image. In some embodiments, the metadata associated with the first image is determined based on an annotation on the slide. In some embodiments, the algorithm is capable of detecting a feature in an image. In some embodiments, the feature is a nucleus of a cell.

Still referring to FIG. 9, in some embodiments, method 900 may include identifying a control command as a function of the selected algorithm upon execution of the selected algorithm 915. In some embodiments, identifying the control command may include transmitting the first image to a computing device configured to execute the algorithm, wherein the processor is communicatively connected to the computing device; and receiving, from the computing device, the control command. In some embodiments, the processor and the computing device are communicatively connected using a physical connection.

Still referring to FIG. 9, in some embodiments, method 900 may include configuring the at least an optical system to capture a second image of the slide using the at least an optical system as a function of the control command 920. In some embodiments, the control command comprises a parameter set, and the second image is captured as a function of the parameter set. In some embodiments, the parameter set comprises a focus distance.

Still referring to FIG. 9, in some embodiments, method 900 may further include selecting image data to retain based on the control command.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
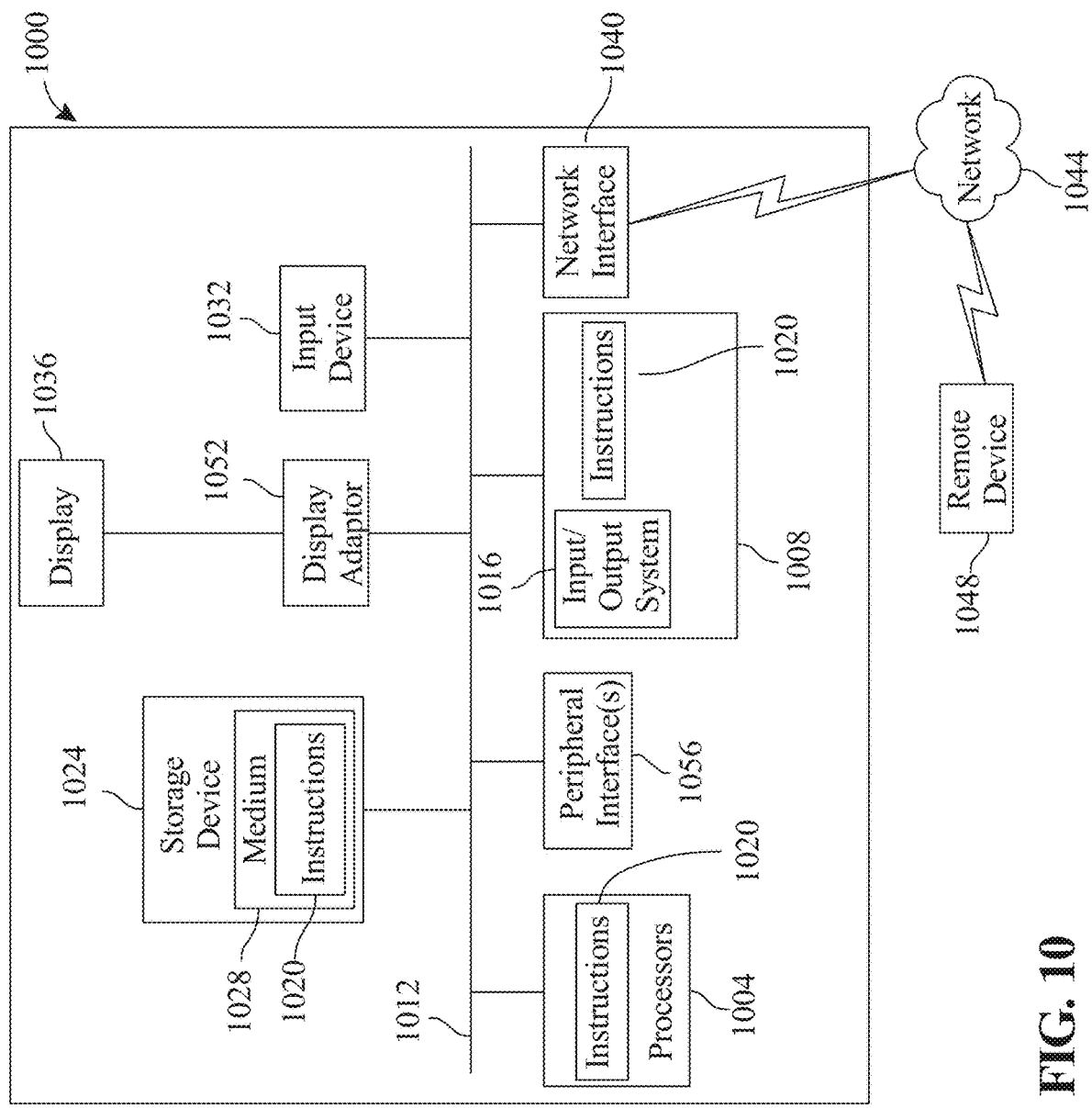
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for imaging a slide, the system comprising:
   a slide port configured to receive a slide;
   at least an optical system, wherein the at least an optical system comprises at least an optical sensor configured to capture a first image of the received slide; and
   a first computing device configured to:
   receive the first image from the at least an optical system, wherein the first image is associated with metadata comprising slide identification information which is saved and retrieved from a database;
   automatically select at least an algorithm to apply to the first image;
   identify a control command as a function of the selected algorithm upon execution of the selected algorithm, and
   configure the at least an optical system to capture a second image of the slide at the slide port through the at least an optical sensor as a function of the control command.

2. The system of claim 1, wherein identifying the control command comprises:
   transmitting the first image to a second computing device configured to execute the algorithm, wherein the first computing device is communicatively connected to the second computing device; and
   receiving, from the second computing device, the control command.

3. The system of claim 2, wherein the first computing device and the second computing device are communicatively connected using a physical connection.

4. The system of claim 1, wherein the algorithm is selected as a function of the metadata associated with the first image.

5. The system of claim 4, wherein the metadata associated with the first image is determined based on an annotation on the slide.

6. The system of claim 1, wherein the algorithm is capable of detecting a feature in an image, and wherein the control command is determined as a function of a feature detected in the image.

7. The system of claim 1, wherein the control command comprises a parameter set, and the second image is captured as a function of the parameter set.

8. The system of claim 7, wherein the parameter set comprises a focus distance.

9. The system of claim 7, wherein the parameter set comprises a magnification.

10. The system of claim 7, wherein the parameter set comprises a position on the slide.

11. A method of imaging a slide, the method comprising:
    using at least a processor, receiving a first image of a slide from at least an optical system, wherein the first image is associated with metadata comprising slide identification information which is saved and retrieved from a database;
    using at least a processor, automatically selecting at least an algorithm to apply to the first image;
    using at least a processor, identifying a control command as a function of the selected algorithm upon execution of the selected algorithm; and
    using at least a processor, configuring the at least an optical system to capture a second image of the slide using the at least an optical system as a function of the control command.

12. The method of claim 11, wherein identifying the control command comprises:
    transmitting the first image to a computing device configured to execute the algorithm, wherein the processor is communicatively connected to the computing device; and
    receiving, from the computing device, the control command.

13. The method of claim 12, wherein the processor and the computing device are communicatively connected using a physical connection.

14. The method of claim 11, wherein the algorithm is selected as a function of the metadata associated with the first image.

15. The method of claim 14, wherein the metadata associated with the first image is determined based on an annotation on the slide.

16. The method of claim 11, wherein the algorithm is capable of detecting a feature in an image, and wherein the control command is determined as a function of a feature detected in the image.

17. The method of claim 11, wherein the control command comprises a parameter set, and the second image is captured as a function of the parameter set.

18. The method of claim 17, wherein the parameter set comprises a focus distance.

19. The method of claim 17, wherein the parameter set comprises a magnification.

20. The method of claim 17, wherein the parameter set comprises a position on the slide.

\* \* \* \* \*